US011343795B2

(12) United States Patent
Vaidya et al.

(10) Patent No.: US 11,343,795 B2
(45) Date of Patent: *May 24, 2022

(54) PAGING RELATED METHODS AND APPARATUS

(71) Applicant: Charter Communications Operating, LLC, St. Louis, MO (US)

(72) Inventors: Maulik Vaidya, Escondido, CA (US);
Curt Wong, Bellevue, WA (US);
Yildirim Sahin, Englewood, CO (US);
Amitav Mukherjee, Elk Grove, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,732

(22) Filed: Jun. 22, 2020

(65) Prior Publication Data
US 2020/0322920 A1 Oct. 8, 2020

Related U.S. Application Data

(63) Continuation of application No. 16/270,513, filed on Feb. 7, 2019, now Pat. No. 10,694,495.

(60) Provisional application No. 62/753,642, filed on Oct. 31, 2018, provisional application No. 62/737,014, filed on Sep. 26, 2018.

(51) Int. Cl.
*H04W 68/02* (2009.01)
*H04W 16/14* (2009.01)

(52) U.S. Cl.
CPC ........... *H04W 68/02* (2013.01); *H04W 16/14* (2013.01)

(58) Field of Classification Search
CPC . H04W 16/14; H04W 36/0055; H04W 36/02; H04W 48/12; H04W 48/20; H04W 52/0216; H04W 68/02; H04W 68/025; H04W 72/1226; H04W 72/1278; H04W 74/0833; H04W 76/14; H04W 76/27; H04W 88/08; H04W 88/10; H04W 36/00;
(Continued)

(56) References Cited

U.S. PATENT DOCUMENTS 6,445,915 B1 * 9/2002 Baiyor .................... H04M 3/46
379/211.01
6,678,258 B1 * 1/2004 Capurka ............. H04W 84/025
370/328

(Continued)

*Primary Examiner* — Nathan S Taylor
(74) *Attorney, Agent, or Firm* — Straub & Straub; Michael P. Straub; Stephen T. Straub

(57) ABSTRACT

Methods and apparatus for efficient paging in a communications system using unlicensed spectrum are described. A base station, which uses unlicensed spectrum, receives a paging request message from a network node and performs paging operations attempting to page the UE. The paging attempt may fail due to the base station being unable to transmit a paging signal to the UE because the unlicensed spectrum is currently unavailable or because the UE did not respond to a transmitted page. The base station generates and transmits a paging failure response message including a failure cause code indicating the reason that the paging attempt failed. The network node receives the paging failure response message, recovers the failure cause code, and implements a paging escalation strategy as a function of the recovered failure cause code.

20 Claims, 20 Drawing Sheets

(58) Field of Classification Search
CPC ..... H04W 52/02; H04W 68/00; H04W 72/00; H04W 72/04; H04W 74/08
USPC .................................. 455/452.1, 561, 574
See application file for complete search history.

(56) References Cited

U.S. PATENT DOCUMENTS

| | | | |
|---|---|---|---|
| 2006/0009242 A1* | 1/2006 | Ryu | H04W 68/02 455/458 |
| 2011/0105155 A1* | 5/2011 | Bienas | H04W 68/02 455/458 |
| 2013/0322277 A1* | 12/2013 | Vanganuru | H04L 1/20 370/252 |
| 2014/0106790 A1* | 4/2014 | Kakinada | H04W 68/02 455/458 |
| 2014/0243026 A1* | 8/2014 | Essigmann | H04W 68/02 455/458 |
| 2015/0031382 A1* | 1/2015 | Damnjanovic | H04W 68/025 455/452.1 |
| 2015/0365931 A1* | 12/2015 | Ng | H04L 1/1893 370/329 |
| 2016/0007170 A1* | 1/2016 | Vaidya | H04W 68/02 370/312 |
| 2016/0007316 A1 | 1/2016 | Vaidya et al. | |
| 2016/0100442 A1* | 4/2016 | Xu | H04W 72/0453 370/329 |
| 2016/0233989 A1* | 8/2016 | Belghoul | H04L 5/0092 |
| 2016/0234841 A1* | 8/2016 | Pao | H04W 72/1226 |
| 2016/0286523 A1* | 9/2016 | Yu | H04W 48/16 |
| 2016/0345262 A1 | 11/2016 | Jain et al. | |
| 2017/0230933 A1* | 8/2017 | Radulescu | H04W 68/00 |
| 2018/0007657 A1* | 1/2018 | Damnjanovic | H04W 72/0453 |
| 2018/0109958 A1* | 4/2018 | Zhang | H04W 72/1263 |
| 2018/0198867 A1* | 7/2018 | Dao | H04W 76/34 |
| 2018/0206214 A1* | 7/2018 | Bendlin | H04L 5/0053 |
| 2018/0227880 A1* | 8/2018 | Su | H04W 76/27 |
| 2018/0270713 A1* | 9/2018 | Park | H04W 28/18 |
| 2018/0270791 A1* | 9/2018 | Park | H04W 8/24 |
| 2018/0270792 A1 | 9/2018 | Park et al. | |
| 2018/0270894 A1* | 9/2018 | Park | H04W 76/27 |
| 2018/0270895 A1* | 9/2018 | Park | H04W 76/38 |
| 2019/0020617 A1* | 1/2019 | Truchan | H04W 8/26 |
| 2019/0238345 A1* | 8/2019 | Gage | H04L 9/14 |
| 2019/0289571 A1* | 9/2019 | Park | H04W 60/00 |
| 2019/0349883 A1* | 11/2019 | Fujishiro | H04W 76/11 |
| 2020/0026661 A1* | 1/2020 | Kounavis | G06F 12/1425 |
| 2020/0084717 A1* | 3/2020 | Hoglund | H04W 68/02 |
| 2020/0092846 A1* | 3/2020 | Deng | H04B 7/0695 |
| 2020/0100208 A1 | 3/2020 | Vaidya et al. | |
| 2020/0100210 A1 | 3/2020 | Vaidya et al. | |
| 2020/0107373 A1 | 4/2020 | Roy et al. | |
| 2020/0120592 A1 | 4/2020 | Geng et al. | |
| 2021/0176710 A1 | 6/2021 | Tooher et al. | |

* cited by examiner

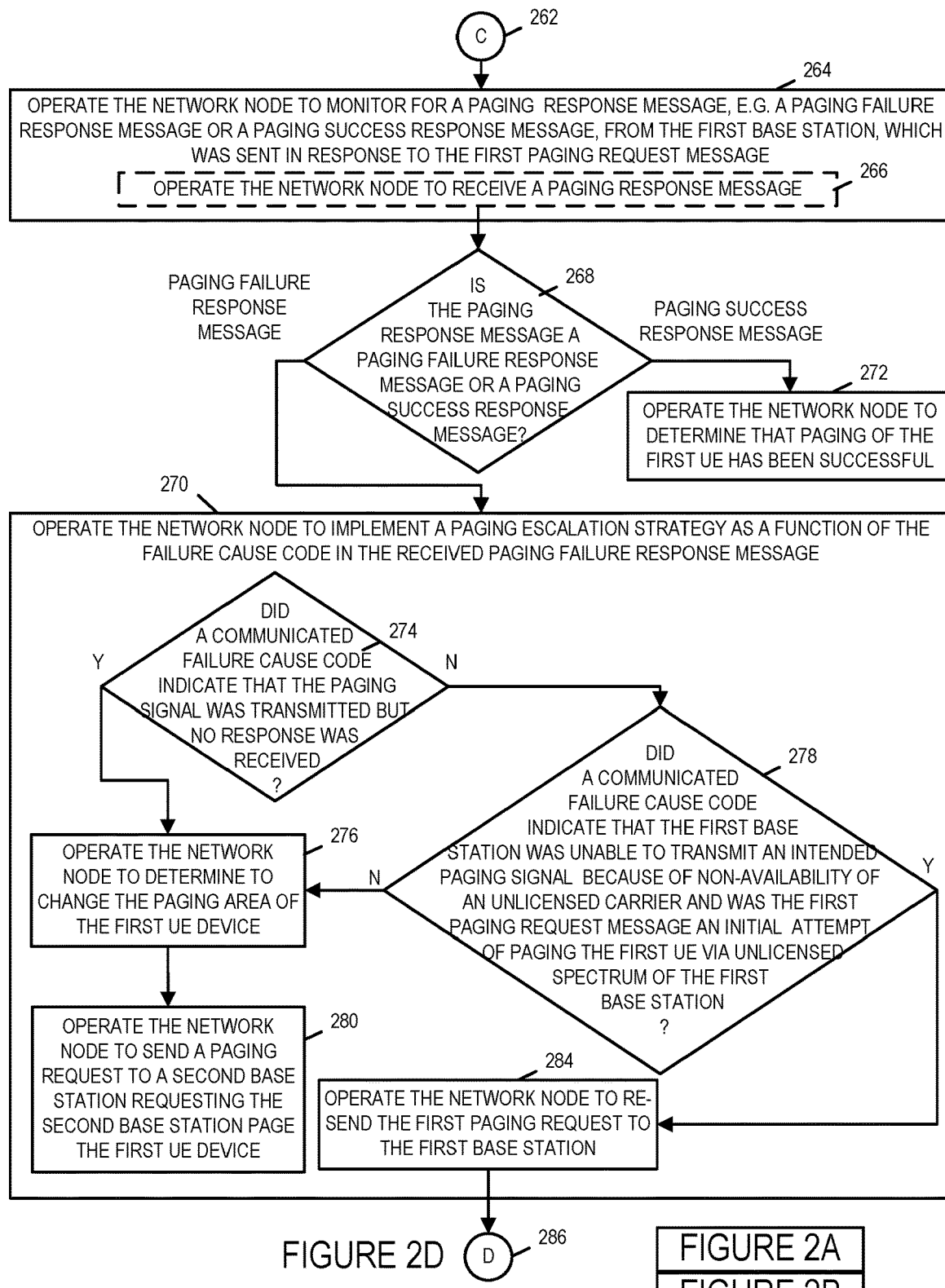

| FIGURE 4A | FIGURE 4B | FIGURE 4C |

| FIGURE 14A | FIGURE 14B |

PAGING RELATED METHODS AND APPARATUS

RELATED APPLICATIONS

The present application is a continuation of U.S. patent application Ser. No. 16/270,513 filed Feb. 7, 2019, which published as US 2020-0100206 A1 and which claims the benefit of U.S. Provisional Application Ser. No.: 62/737,014 filed Sep. 26, 2018 and U.S. Provisional Application Ser. No.: 62/753,642 filed Oct. 31, 2018 which are hereby expressly incorporated by reference in their entirety.

FIELD

The present application relates to communications methods and apparatus, and more particularly, to paging related methods and apparatus using unlicensed spectrum.

BACKGROUND

Wireless communications systems are starting to make wider use of unlicensed spectrum. However, with the use of unlicensed spectrum, there is the uncertainty that the physical medium for transmission may not be available at the desired time of the intended wireless signal transmission. With paging operations in licensed spectrum, paging signaling from a base station can be scheduled, and it may be assumed that a paging request from a core node to a base station to page a UE is carried out. However, with unlicensed spectrum, the base station may be unable to transmit a core node requested page due to current unavailability of the unlicensed spectrum in the vicinity of the base station. This creates uncertainty at the core node requesting the page, since the core node does not know the reason that its page request has not been responded to. The core node can not efficiently make paging decisions, e.g., regarding expanding the page range, if the core node does not know the reason for the paging failure.

Based on the above discussion there is a need for new methods and apparatus for supporting paging and particularly paging in unlicensed spectrum.

SUMMARY

Methods and apparatus for efficient paging in a communications system using unlicensed spectrum are described. Various features are directed to efficient paging in unlicensed spectrum, with various aspects relating to one or more of: base station/core network node features, access and mobility function (AMF) node features and/or signaling features. Some feature are directed to a paging request message while other features are directed to novel paging response messages. The paging response messages in some embodiments include a paging failure response message, and in some embodiments, a paging success response message. The paging failure response message communicates in some but not necessarily all embodiments a failure cause code indicating a reason for paging failure. The failure indication may be and sometimes does depend on the spectrum in which the page was attempted. For unlicensed spectrum a paging failure indication may be and sometime is one of the following: i) currently unavailable unlicensed spectrum (e.g., due to Listen Before Talk (LBT) not clearing), or ii) no response received from UE in response to transmitted paging signal in unlicensed spectrum). Some features relate to a network node, e.g., AMF, using the received failure cause code to implement an efficient paging escalation strategy. Different embodiments may include and support different features and devices. Accordingly, while various features and/or devices are discussed they are not necessary for all embodiments.

A base station (gNB or ng-eNB), which uses unlicensed spectrum, receives a paging request message from a network node, e.g., an Access and Mobility management Function (AMF) device, to page a user equipment (UE) device. The base station performs paging operations attempting to page the UE. In one scenario, the paging attempt fails due to the base station being unable to transmit a paging signal to the UE because the unlicensed spectrum is currently unavailable to the base station, e.g. a listen before talk (LBT) operation performed by the base station did clear the base station to use the unlicensed spectrum. In another scenario, the base station determines that the unlicensed spectrum is available for the base station to use, and the base station transmits a paging signal to page the UE; however, the paging attempt fails because the UE does not respond, e.g., the UE is not in the coverage area of the base station or the UE is powered down. The base station generates and transmits a paging response message to the network node, e.g. a paging failure response message including a failure cause code indicating the reason that the paging attempt failed. The network node receives the paging failure response message, recovers the failure cause code, and implements a paging escalation strategy as a function of the recovered failure cause code.

An exemplary method of operating a communications system including at least one base station that uses unlicensed spectrum, in accordance with some embodiments, comprises: receiving, at a first base station a first paging request from a network node, used to control paging of user equipment (UE) devices, said first paging request being a request to page a first UE device; operating the first base station to perform a paging operation to page the first UE device using unlicensed spectrum; operating the first base station to determine whether said paging operation was successful or unsuccessful; when it is determined that said paging operation was unsuccessful, operating the first base station to communicate a paging response to the network node in response to said first paging request indicating that the paging operation was unsuccessful; and when it is determined that said paging operation was successful, operating the first base station to perform one of i) proceeding with normal base station operation without sending a paging response message to the network node in response to said first paging request or ii) sending a paging success response message to the network node in response to said paging request.

An exemplary communications system, in accordance with some embodiments, comprises: a first base station that uses unlicensed spectrum, said first base station including: a first processor configured to: control the first base station to receive, at a first base station a first paging request from a network node, used to control paging of user equipment (UE) devices, said first paging request being a request to page a first UE device; control the first base station to perform a paging operation to page the first UE device using unlicensed spectrum; determine whether said paging operation was successful or unsuccessful; control the first base station to communicate a paging response to the network node in response to said first paging request indicating that the paging operation was unsuccessful, when it is determined that said paging operation was unsuccessful, and control the first base station to perform one of i) proceeding with normal base station operation without sending a paging response message to the network node in response to said first paging request or ii) sending a paging success response message to the network node in response to said paging request, when it is determined that said paging operation was successful.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

BRIEF DESCRIPTION OF THE FIGURES

FIG. 2D is a fourth part of a flowchart of an exemplary method of operating a communications system including at least one base station, e.g., a gNB or ng-eNB, that uses at least some unlicensed spectrum and transmits paging signals in the unlicensed spectrum, in accordance with an exemplary embodiment.

FIG. 2 comprises the combination of FIG. 2A, FIG. 2B, FIG. 2C and FIG. 2D.

DETAILED DESCRIPTION

Figure 1:
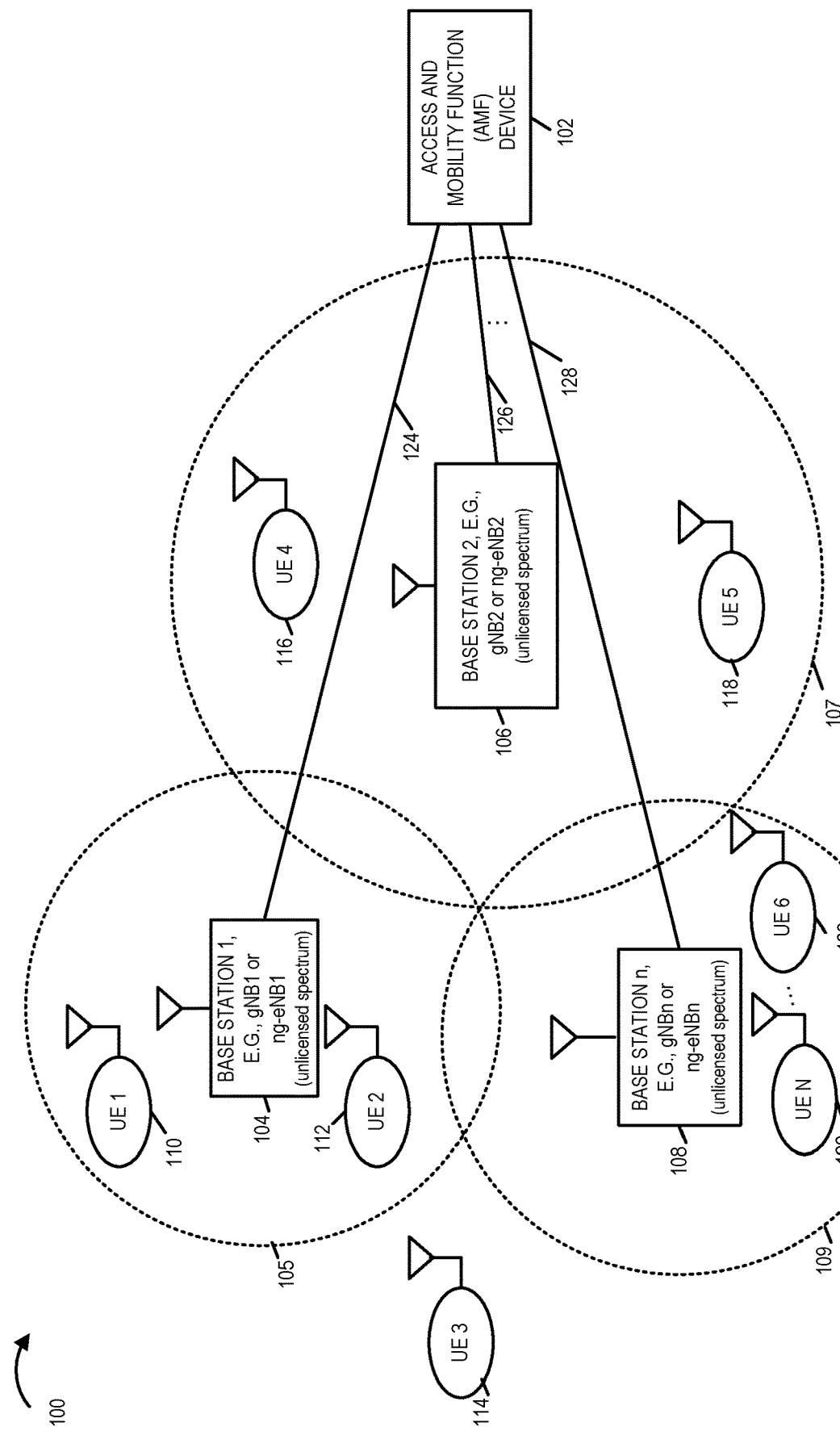
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes an access and mobility function (AMF) device 102, a plurality of base stations (base station 1 104, e.g., gNB 1 or ng-eNB 1, base station 2 106, e.g., gNB 2 or ng-eNB 2, . . . , base station n 108, e.g., gNBn or ng-eNBn), and a plurality of user equipment (UE) devices (UE 1 110, UE 2 112, UE 3 114, UE 4 116, UE 5 118, UE 6 120, . . . , UE N 122). Each of the base stations (base station 1 104, base station 2 106, . . . , base station n 108) has a corresponding wireless coverage area (105, 107, . . . , 109), respectively. AMF 102 is coupled to base station 1 104 via communications connection 124. AMF 102 is coupled to base station 2 106 via communications connection 126. AMF 102 is coupled to base station n 108 via communications connection 128. The base stations (104, 106, . . . , 108) can, and sometimes do, use unlicensed spectrum, e.g. unlicensed spectrum using a first unlicensed carrier. In some embodiments, at least some of the base stations (104, 106, . . . , 108) support communications over multiple different unlicensed spectrums. In some embodiments, at least some different base stations (104, 106, . . . , 108) use different unlicensed spectrum. In some embodiments, at least some of the base stations (104, 106, . . . , 108) use licensed spectrum. In some embodiments, at least some of the base stations (104, 106, . . . , 108) use licensed and unlicensed spectrum.

At least some of the UE devices (110, 112, 114, 116, 118, 120, . . . , 122) are mobile devices which may move throughout the communications system 100. In the drawing of FIG. 1, UE 1 110 and UE 2 112 are shown to be currently within the wireless coverage area 105 of base station 1 104. UE 3 114 is shown to be currently outside the coverage areas (105, 107, 109) of the base stations. UE 4 116 and UE 5 118 are shown to be currently within the wireless coverage area 107 of base station 2 106. UE 6 120 and UE N 122 are shown to be currently within the wireless coverage area 109 of base station 3 108.

Due to pending downlink data (in UPF buffer) destined for a UE in idle mode (5GMM_IDLE), the AMF 102 generates and sends a paging request for paging that particular UE to one or more of the base stations (104, 106, . . . 108). A base station (e.g., base station 104, 106, or 108), which receive the paging request from the AMF 102, determines if unlicensed spectrum intended to be used by the base station is currently available, and if the determination is that the unlicensed spectrum is available, the base station generates and transmits a paging signal to the UE in unlicensed spectrum. The UEs (110, 112, 114, 116, 118, 120, . . . 122) monitor for and detect paging signals in unlicensed spectrum. If the paging attempt is unsuccessful, the base station generates and sends a paging response message to the AMF 102, e.g., a paging failure response message. In various embodiments, the paging failure response message includes a failure cause code indicating the reason for the paging failure, e.g., the base station was unable to transmit the paging request to the UE because the unlicensed spectrum was unavailable (e.g., due to listen before talk (LBT) performed by the base station not clearing) or the UE did not respond to a transmitted paging request which was transmitted by the base station in the unlicensed spectrum, e.g., because the UE was not in the coverage area of the base station or the UE was powered down. The AMF 102 receives the paging failure response message, recovers the failure cause code, and implements a paging escalation strategy as a function of the recovered failure cause code.

Figure 2A:
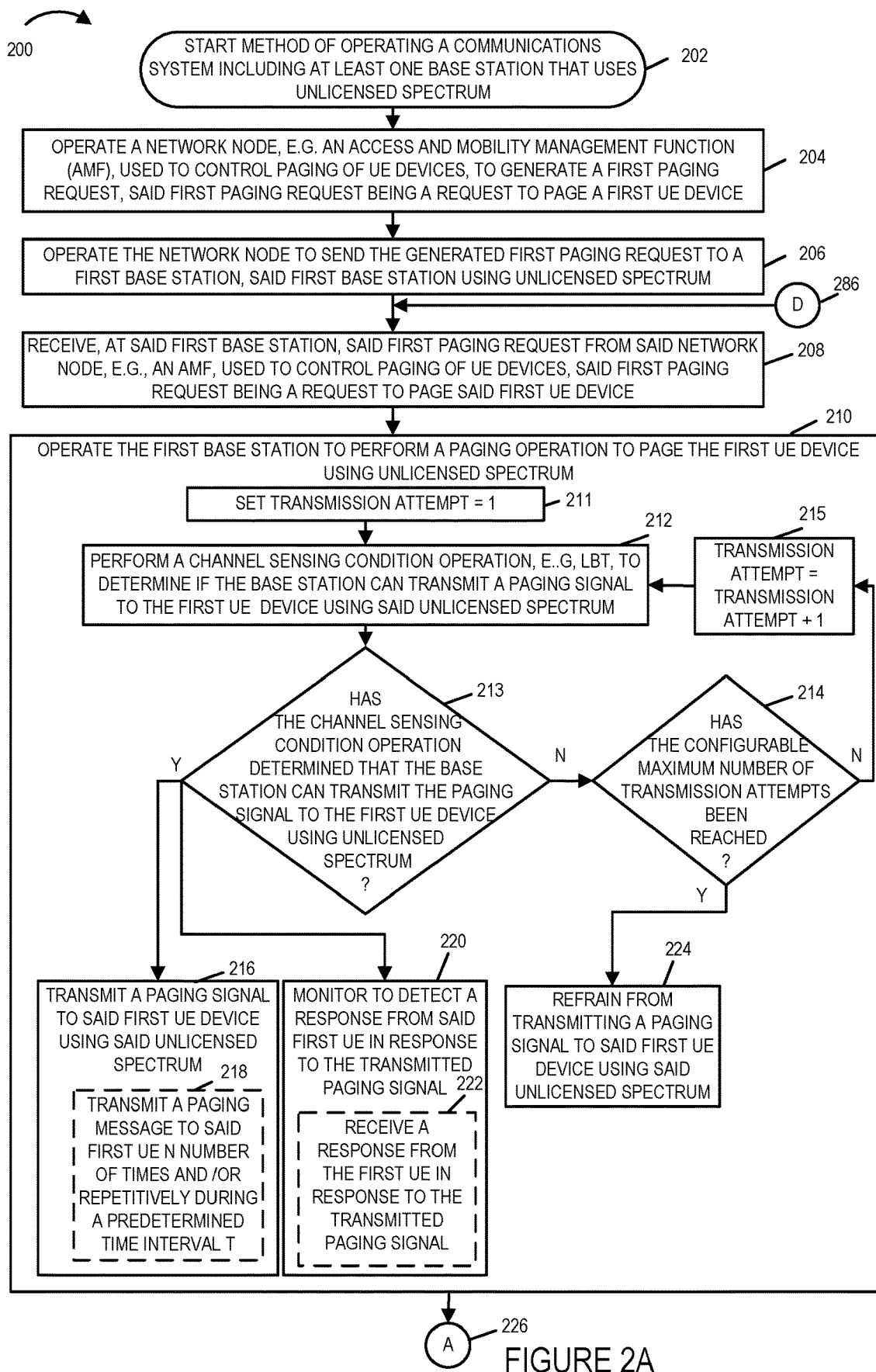
FIG. 2A is a first part of a flowchart of an exemplary method of operating a communications system including at least one base station, e.g., a gNB or ng-eNB, that uses at least some unlicensed spectrum and transmits paging signals in the unlicensed spectrum, in accordance with an exemplary embodiment.
Figure 2B:
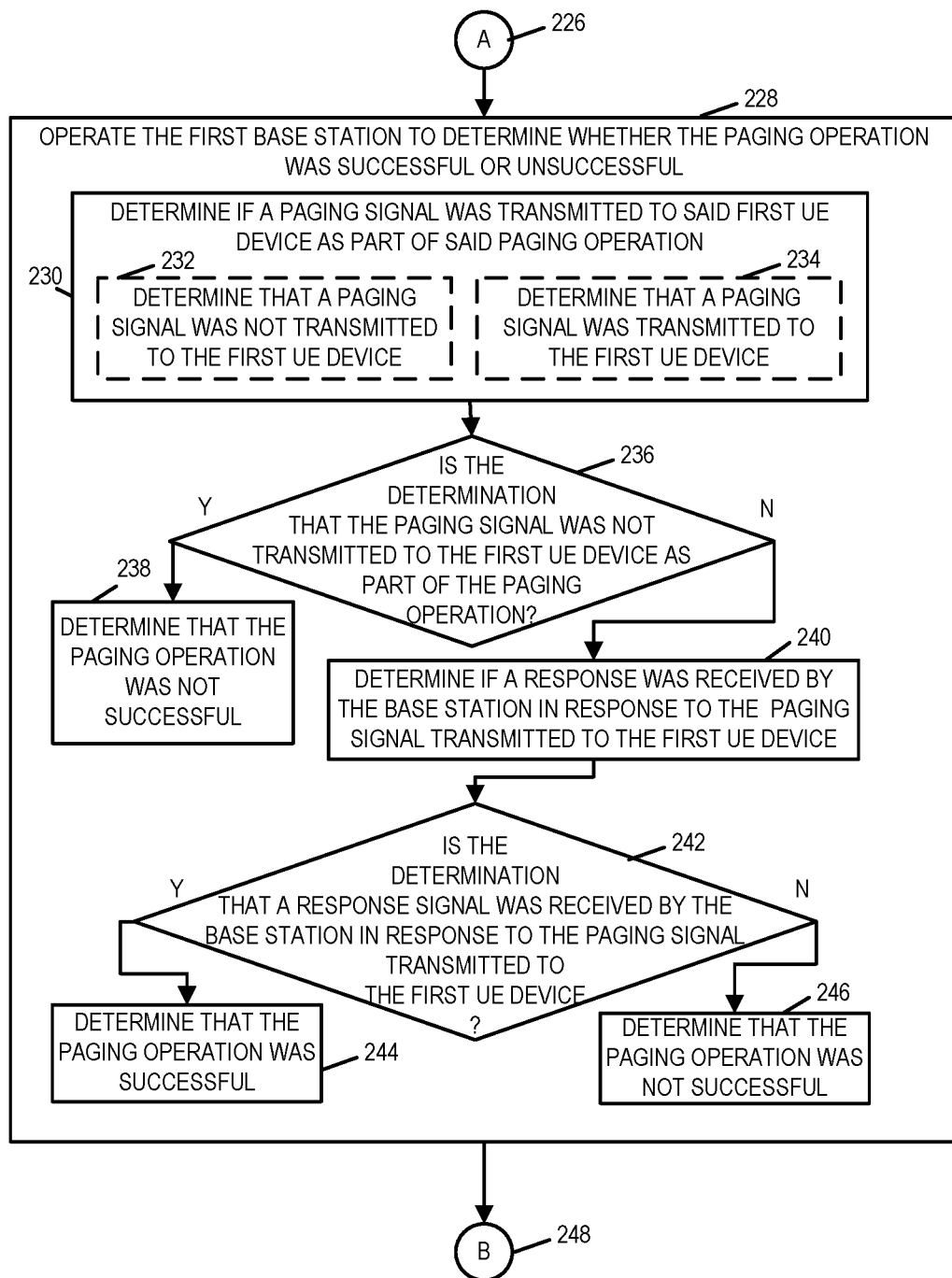
FIG. 2B is a second part of a flowchart of an exemplary method of operating a communications system including at least one base station, e.g., a gNB or ng-eNB, that uses at least some unlicensed spectrum and transmits paging signals in the unlicensed spectrum, in accordance with an exemplary embodiment.
Figure 2C:
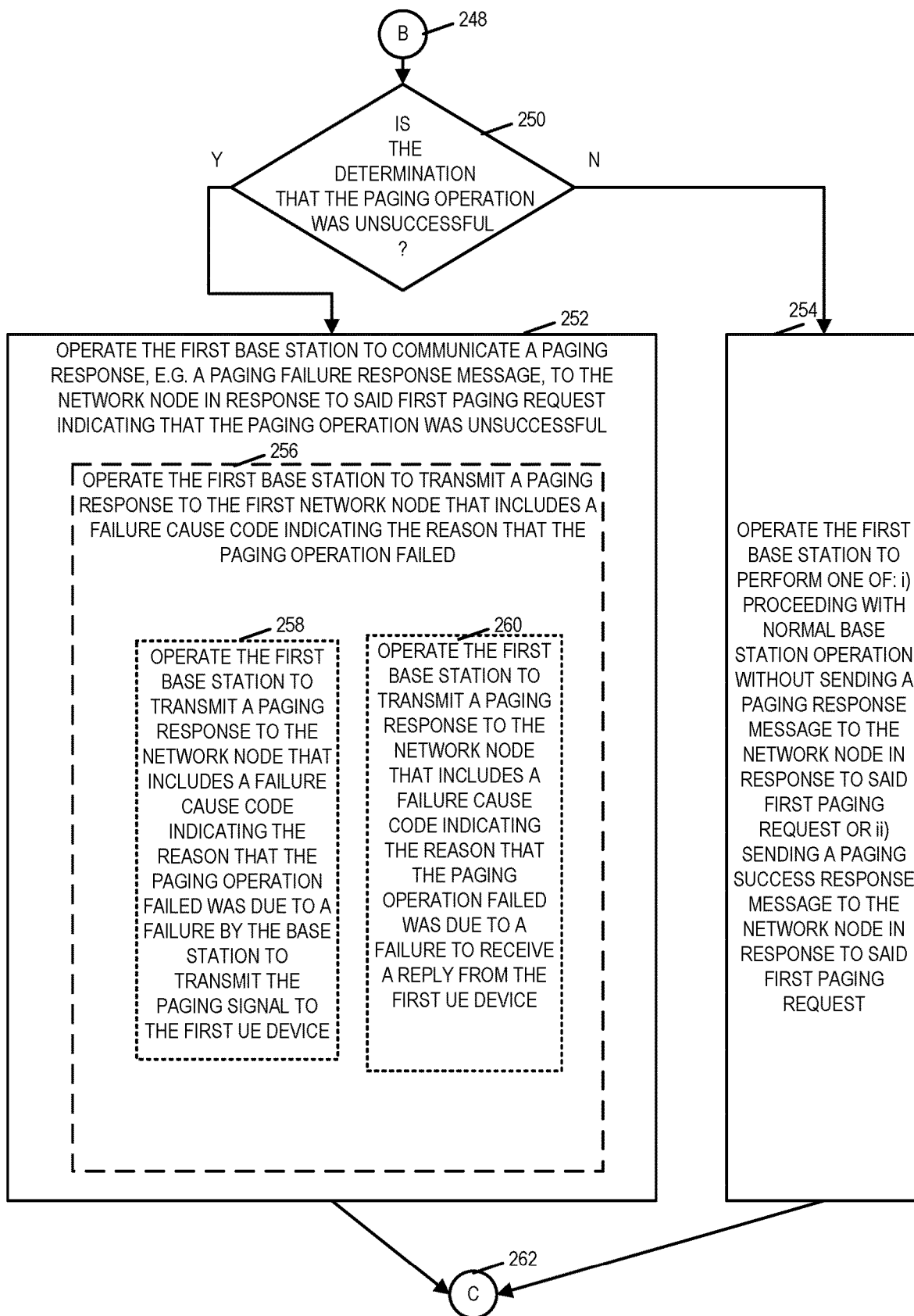
FIG. 2C is a third part of a flowchart of an exemplary method of operating a communications system including at least one base station, e.g., a gNB or ng-eNB, that uses at least some unlicensed spectrum and transmits paging signals in the unlicensed spectrum, in accordance with an exemplary embodiment.

FIG. 2, comprising the combination of FIG. 2A, FIG. 2B, FIG. 2C and FIG. 2D, is a flowchart 200 of an exemplary method of operating a communications system including at least one base station, e.g., a gNB or ng-eNB, that uses unlicensed spectrum in accordance with an exemplary embodiment. Operation starts in step 202, in which the communications system is powered on and initialized, and proceeds to step 204.

In step 204 a network node, e.g., an access and mobility management function (AMF), used to control paging of user equipment (UE) devices, generates a first paging request, said first paging request being a request to page a first UE device. Operation proceeds from step 204 to step 206. In step 206 the network node sends the generated first paging request to a first base station, e.g., a gNB or an ng-eNB, said first base station using unlicensed spectrum. Operation proceeds from step 206 to step 208.

In step 208, the first base station receives said first paging request from said network node, e.g., an AMF, used to control paging of UE devices, said first paging request being a request to page said first UE device. In some embodiments, the first paging request is a class 1 N2-AP Paging_U message. Operation proceeds from step 208 to step 210.

In step 210 the first base station performs a paging operation to page the first UE device using unlicensed spectrum. Step 210 includes steps 211, 212, 213, 214, 215, 216, 220 and 224.

In step 211, the first base station sets the value of the variable transmission attempt to 1. Operation proceeds from step 211 to step 212. In step 212 the first base station performs a channel sensing condition operation, e.g., a listen before talk (LBT) operation, to determine if the first base station can transmit a paging signal to the first UE device using said unlicensed spectrum. Operation proceeds from step 212 to step 213. In step 213, if the channel sensing condition operation has determined that the first base station can transmit the paging signal to the first UE device using the unlicensed spectrum, then operation proceeds from step 213 to step 216 and step 220. In step 216 the first base station transmits a paging signal to said first UE device using said unlicensed spectrum. In some embodiments, step 216 includes step 218, in which the first base station transmits a paging message to said first UE device N number of time and/or repetitively during a predetermined time interval T. In step 220 the first base station monitors to detect a response from said first UE device in response to the transmitted paging signal of step 216. Step 220 may, and sometimes does, include step 222, in which the first base station receives a response from the first UE device in response to the transmitted paging signal of step 216.

Alternatively, in step 213, if the channel sensing condition operation has determined that the first base station can not transmit the paging signal to the first UE device using the unlicensed spectrum, then operation proceeds from step 213 to step 214, in which the first base station determines if the configurable maximum number of transmission attempts has been reached. For example, the configurable maximum number of transmission attempts has been previously configured, e.g., set, to a predetermined integer, e.g., three. In step 214, the first base station compares the current value of the variable transmission attempt to the maximum number of transmission attempts, and controls operation as a function of the determination. If the current value of the transmission attempt does not equal the maximum number of transmission attempts, then operation proceeds from step 214 to step 215, in which the first base station increments the current value of the variable transmission attempt. Operation proceeds from step 215 to step 212, in which another iteration of the channel sensing condition operation, e.g., another iteration of LBT, is performed. Alternatively, in step 214, if the current value of the transmission attempt equals the maximum number of transmission attempts, then operation proceeds from step 214 to step 224. In step 224, the first base station is controlled to refrain from transmitting a paging signal to said first UE device using said unlicensed spectrum.

Operation proceeds from step 210, via connecting node A 226, to step 228, in which the first base station determines whether the paging operation was successful or unsuccessful. Step 228 includes steps 230, 236, 238, 240, 242, 244, and 246. In step 230 the first base station determines if a paging signal was transmitted to said first UE device as part of the paging operation. During some iterations of step 230, the first base station determines in step 232 that a paging signal was not transmitted to said first UE device as part of said paging operation. During some iterations of step 230, the first base station determines in step 234, that a paging signal was transmitted to said first UE device as part of said paging operation. Operation proceeds from step 230 to step 236. In step 236, if the determination is that the paging signal was not transmitted to the first UE device as part of the paging operation, then operation proceeds from step 236 to step 238 in which the first base station determines that the paging operation was not successful. However, in step 236 if the determination is that the paging signal was transmitted to the first UE device as part of the paging operation, then, operation proceeds from step 236 to step 240, in which the first base station determines if a response was received by the first base station in response to the paging signal transmitted to the first UE device. Operation proceeds from step 240 to step 242. In step 242, if the determination is that a response signal was received by the first base station in response to the paging signal transmitted to the first UE device, then operation proceeds from step 242 to step 244, in which the first base station determines that the paging operation was successful. However, in step 242, if the determination is that a response signal was not received by the first base station in response to the paging signal transmitted to the first UE device, then operation proceeds from step 242 to step 246, in which the first base station determines that the paging operation was not successful.

Operation proceeds from step 228, via connecting node B 248, to step 250. In step 250, if the determination is that the paging operation was unsuccessful, then operation proceeds from step 250 to step 252. In step 250, if the determination is that the paging operation was successful then operation proceeds from step 250 to step 254.

In step 252 the first base station communicates a paging response, e.g., a paging failure response message, to the network node in response to the first paging request, said paging response indicating that the paging operation was unsuccessful. In some embodiments, step 252 includes step 256.

In step 256 the first base station transmits a paging response, e.g., a paging response signal, to the first network node that includes a failure cause code indicating the reason that the paging operation failed. In some embodiments, the paging response signal is a N2-AP:PAGING_U RESPONSE message including a failure cause code. In some embodiments, step 256 includes step 258 and 260, and one of steps 258 and 260 is performed during an iteration of step 256.

In step 258 the first base station transmits a paging response to the first network node that includes a failure cause code indicating the reason that the paging operation failed was due to a failure by the first base station to transmit the paging signal to the first UE device, e.g., in response to step 238 determining that the paging operation was not successful. In step 260 the first base station transmits a paging response to the first network node that includes a failure cause code indicating the reason that the paging operation failed was due to a failure to receive a reply from the first UE device, e.g., in response to step 246 determining that the paging operation was not successful.

Returning to step 254, in step 254 the first base station performs one of: i) proceeding with normal operation without sending a paging response message to the network node in response to the said first paging request or ii) sending a paging success response message to the network node in response to the first paging request.

Operation proceeds from step 252, via connecting node C 262, to step 264. In some embodiments, e.g. an embodiment in which the first base station may, and sometimes does, send paging response success messages, operation proceed from step 254, via connecting node C 262, to step 264. In step 264 the network node monitors for a paging response message, e.g., a paging failure response message or a paging success response message, from the first base station, which was sent in response to the first paging request message. Step 264 may, and sometimes does, include step 266, in which the network node receives a paging response message. Operation proceeds from step 266 to step 268.

In step 268, the network node determines if the paging response message is a paging failure response message or a paging success response message. If the paging response message is a paging success response message, then operation proceeds from step 268 to step 272, in which the network node determines that the paging of the first UE device has been successful. However, if the paging response message is a paging failure response message, then operation proceeds from step 268, to step 270, in which the network node implements a paging escalation strategy as a function of the failure cause code in the received paging response message. Step 270 includes steps 274, 276, 278, 280 and 284. In step 274, if the communicated failure cause code indicates that the paging signal was transmitted but no response was received, then operation proceeds from step 274 to step 276; otherwise, operation proceeds from step 274 to step 278.

In step 276, the network node determines to change the paging area of the first UE device. Operation proceeds from step 276 to step 280, in which the network node sends a paging request message to a second base station requesting the second base station to page the first UE device. In various embodiments, the area covered by the second base station is one of: partially non-overlapping with the area covered by the first base station or ii) fully non-overlapping with the area covered by the first base station.

In step 278 the network node determines if the communicated failure cause code indicates that the first base station was unable to transmit an intended paging signal because of non-availability of unlicensed spectrum (non-availability of unlicensed carrier, e.g., the LBT did not clear), and the attempted failed paging attempt was an initial attempt of paging corresponding to the first paging request, e.g., a first attempt to page the first UE in unlicensed spectrum intended to be used by the first base station. If the determination is that the first base station was unable to transmit an intended paging signal to the first UE because of non-availability of unlicensed spectrum, and the attempted failed paging attempt was an initial attempt of paging corresponding to the first paging request, then operation proceeds from step 278 to step 284, in which the network node re-sends the first paging request to the first base station. Operation proceeds from step 284, via connecting node D 286, to step 208, in which the first base station receives the first paging request.

If the determination of step 278 is that the first base station was unable to transmit an intended paging signal because of non-availability of unlicensed spectrum, but the attempted failed paging attempt was not an initial attempt of paging corresponding to the first paging request, then operation proceeds from step 278 to step 276, in which the network node determines to change the first paging area of the first UE device. Operation proceeds from step 276 to step 280, in the network node sends a paging request to a second base station requesting the second base station to page the first UE device.

In some other embodiments, different approaches are used for expanding the paging coverage area based on received failure fault codes. For example in one embodiment, if the network node receives a failure fault code from a first base station indicating that the first base station successfully transmitted the paging request to the first UE but the first UE did not respond, then the network node refrains from sending additional paging requests to the first base station to page the first UE, but sends a paging request to a different base station. e.g., a second base station, requesting the second base station to page the first UE. However, if the network node receives a failure fault code from the first base station indicating that the first base station was unable to transmit the page because the unlicensed spectrum was unavailable (e.g., LBT did not clear), then the network node sends a paging request to both the first base station and the second base station requesting that the first UE be paged.

Figure 3:
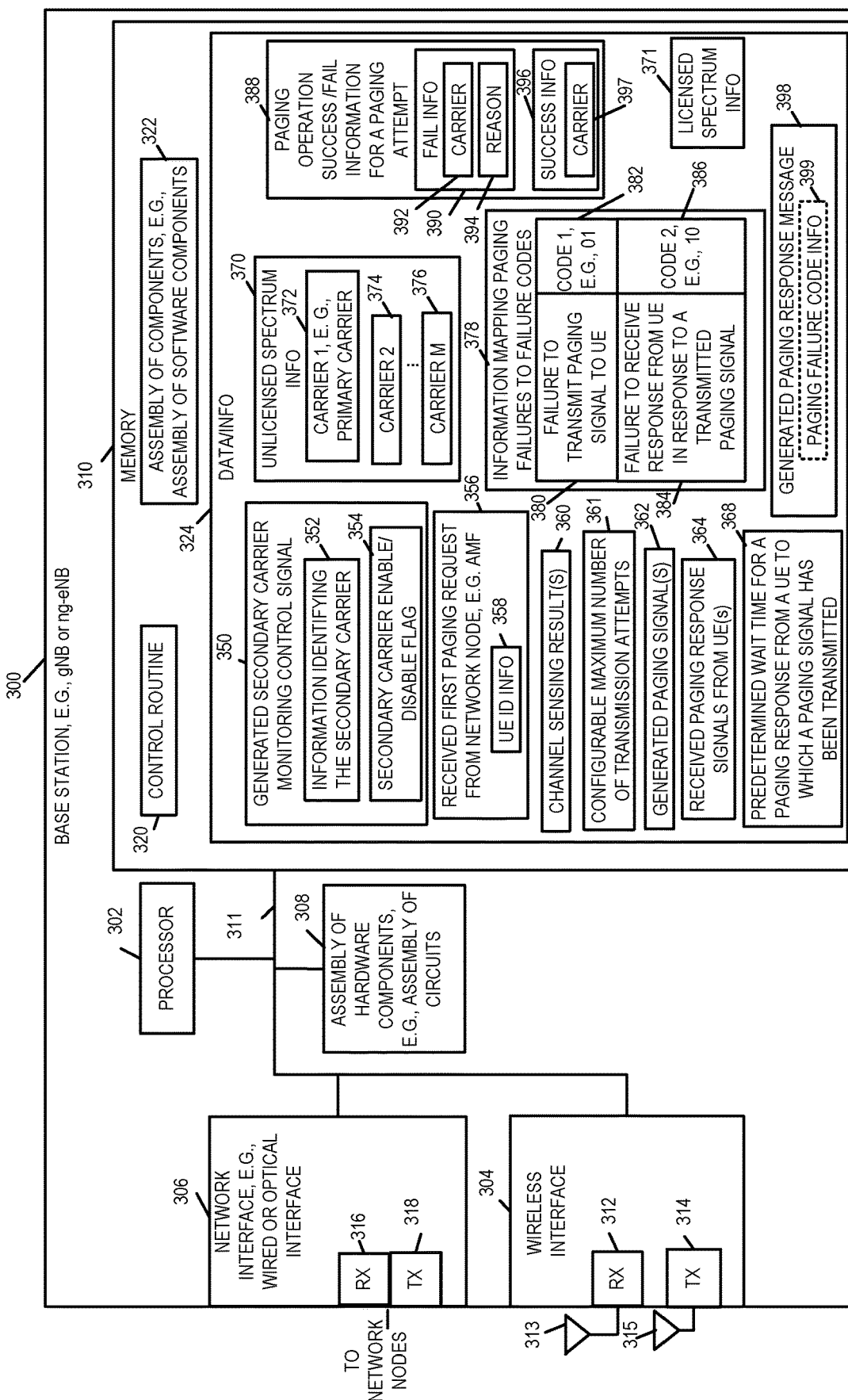
FIG. 3 is a drawing of an exemplary base station, e.g., a gNB or ng-eNB, in accordance with an exemplary embodiment.

FIG. 3 is a drawing of an exemplary base station 300, e.g., a gNB or ng-eNB, in accordance with an exemplary embodiment. In some embodiments, exemplary base station 300 of FIG. 3 implements steps of the exemplary method of flowchart 200 of FIG. 2. Base station 300 is, e.g., any of base stations (base station 1 104, base station 2 106, . . . , base station n 108) of FIG. 1 or any of the base stations (504, 506, 508, 510, 512, 514) of FIG. 5.

Base station 300 includes a processor 302, e.g., a CPU, wireless interface 304, a network interface 306, e.g., a wired or optical interface, an assembly of hardware components 308, e.g., an assembly of circuits, and memory 310 coupled together via a bus 311 over which the various elements may interchange data and information.

Network interface 306 includes a receiver 316 and a transmitter 318. Network interface 306 to coupled to network nodes, e.g., via a backhaul network and/or the Internet. Wireless interface 304 includes a wireless receiver 312 and a wireless transmitter 314. The base station 300 receives signals from network devices, e.g., an AMF, via network receiver 316. An exemplary received signal, which is received via receiver 316, is a first paging request signal, which was sent from a network node, e.g., an AMF, to control paging of UE devices, said first paging request being a request to page a first UE device, e.g., a request to page a first UE device using unlicensed spectrum. An exemplary signal transmitted via transmitter 318 is a paging response signal, e.g., a paging response failure message including a failure code cause indicator, or a paging success response message, said paging response signal being sent to a network node, e.g., an AMF, in response to a previously received paging request.

Wireless receiver 312 is coupled to a receive antenna 313 via which the base station 300 can receive wireless signals, e.g., wireless signals from UE devices. Wireless transmitter 314 is coupled to a transmit antenna 315 via which the base station 300 can transmit wireless signals to UE devices. Exemplary transmitted wireless signals include a unicast paging signal to a first UE device and a multicast or broadcast secondary carrier monitoring control signal to UE devices, said UE devices including said first UE device. Exemplary received wireless signals include a paging response signal from the first UE device.

Memory 310 includes a control routine 320, e.g., for controlling basic functions of the base station, an assembly of components 322, e.g., an assembly of software components, and data/information 324. Data/information 324 includes generated secondary carrier monitoring control signal 350 including information 352 identifying the secondary carrier, e.g., a secondary unlicensed spectrum carrier, and a secondary carrier enable/disable flag 354, e.g., a bit field in the message communicating whether the UEs should or should not monitor for paging signals using the secondary carrier. Data/information further includes unlicensed spectrum information 370 and licensed spectrum information 371. Unlicensed spectrum information 370 includes information corresponding to one or more portions of unlicensed spectrum, which may be, and sometimes are, used for transmitting paging signals to UE devices. Unlicensed spectrum information 370 includes carrier 1, e.g., a primary carrier, information, carrier 2 information 374, . . . , carrier M information 376. Data/information 324 further includes a predetermined wait time value 368 for a paging response from a UE to which a paging signal has been transmitted, which represented the time the base station 300 is to wait, e.g., after transmitting a paging signal, for a response, before declaring the paging attempt as a failure do to no response from the UE. Data/information 324 further includes information 378 mapping paging failures to failure codes. Information 378 includes a failure to transmit a paging signal to the UE 380 which maps to code 1 382, e.g., represented by bit pattern 01. Information 378 further includes a failure to receive a response from a UE to which a paging signal has been transmitted 384 which maps to code 2 386, e.g., represented by bit pattern 10.

Data/information 324 further includes a received first paging request 356 from a network node, e.g. a AMF node, channel sensing result(s) 360, configurable maximum number of transmission attempts 361, e.g., an integer value greater than or equal to one indicating the maximum number of attempts at LBT to be performed before giving up with an attempted paging signal transmission to the UE in unlicensed spectrum, generated paging signal(s) 362, received paging response signal(s) from UE(s) 364, paging operation success/failure information for a paging attempt 388, and a generated paging response message 398 to be sent to the network node which sent the first paging request. Received paging request from the network node 356 includes UE ID information 358 identifying the UE device which is to be paged by the base station. Paging operation success/fail information for a paging attempt 388 includes failure information 390 and/or success information 396. Failure information includes carrier information 392, e.g., information identifying which carrier(s) corresponded to the paging failure, and reason information 394, e.g., information identifying the reason for the paging failure on each of the carriers on which paging was attempted. Success information 395 includes carrier information 397 identifying the carrier on which the successful paging signal was transmitted. Generated paging response message 398, may, and sometimes, does include paging failure code information 399, e.g., a failure code identifying the reason for the paging failure. In some embodiments, in paging was attempted and failed on multiple carriers, the generated paging response message includes a failure code for each of the carriers on which the paging attempt failed. In some embodiments, if the paging attempt was successful the generated paging response message 398 includes information identifying the carrier used for the successful page.

Figures 4, 4C:
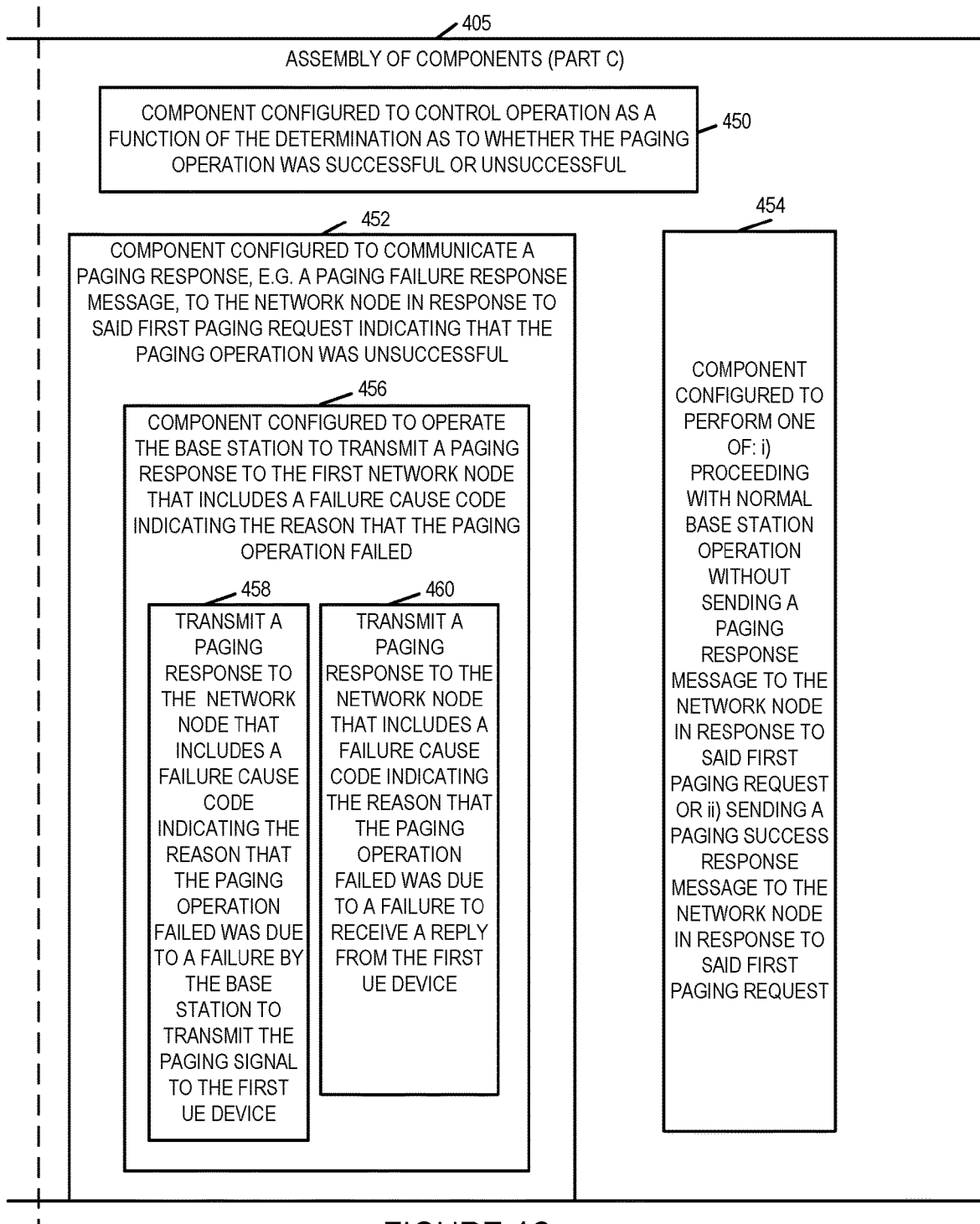
FIG. 4C is a third part of an exemplary assembly of components which may be included in a base station implemented in accordance with an exemplary embodiment.
FIG. 4 comprises the combination of FIG. 4A, FIG. 4B and FIG. 4C.
Figure 4A:
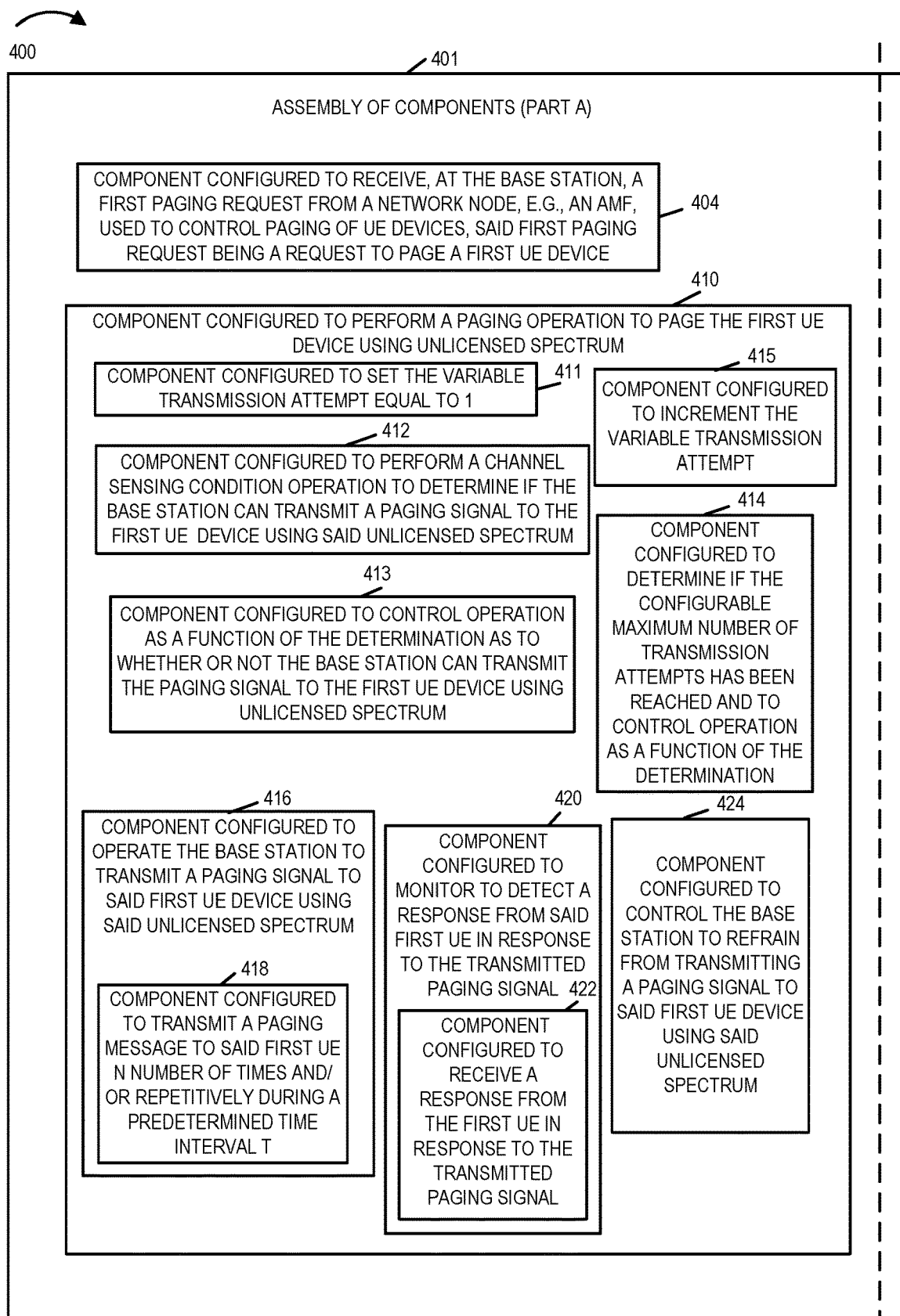
FIG. 4A is a first part of an exemplary assembly of components which may be included in a base station implemented in accordance with an exemplary embodiment.
Figure 4B:
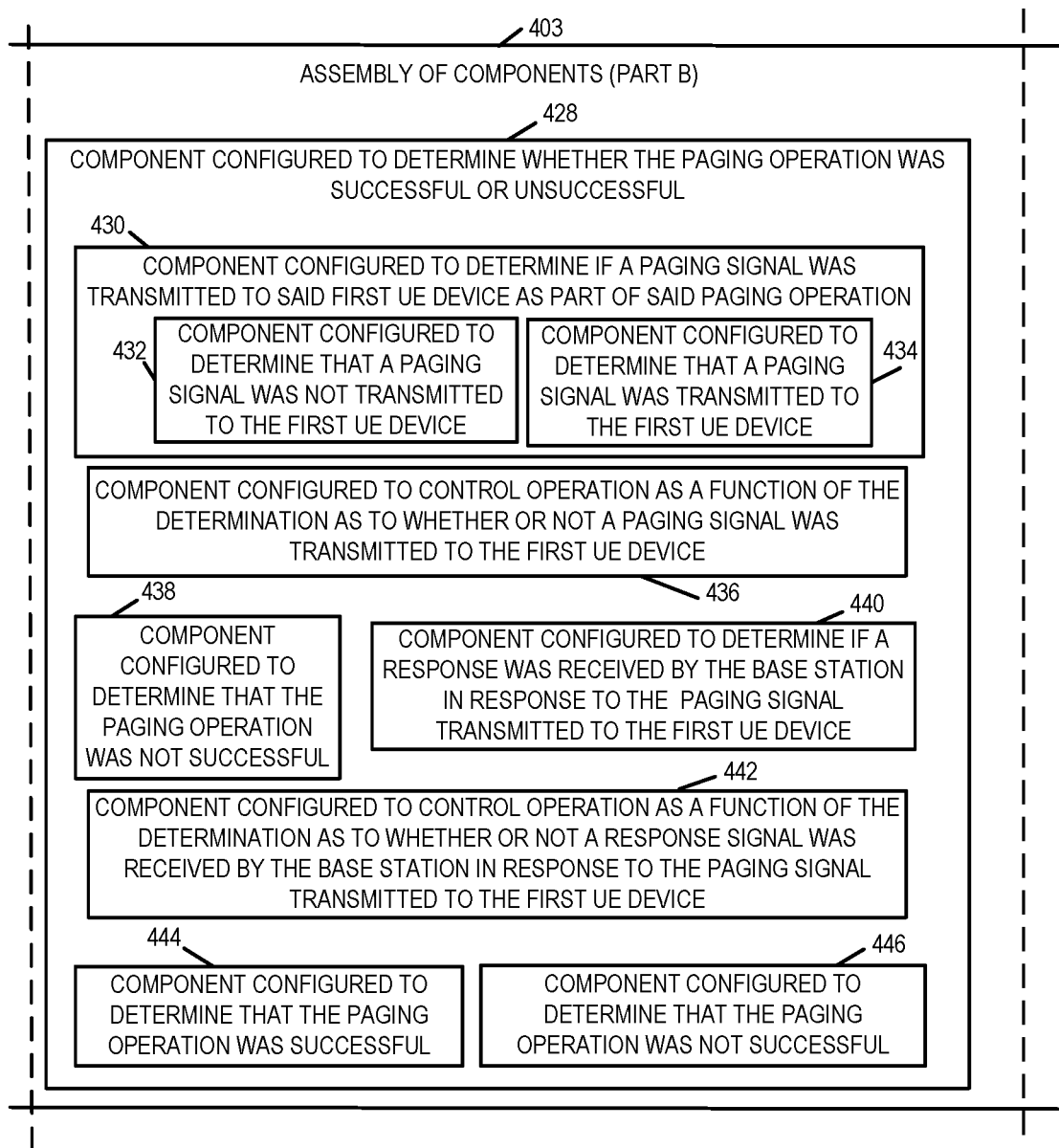
FIG. 4B is a second part of an exemplary assembly of components which may be included in a base station implemented in accordance with an exemplary embodiment.

FIG. 4, comprising the combination of FIG. 4A, FIG. 4B and FIG. 4C, is a drawing of an exemplary assembly of components 400, comprising the combination of Part A 401, Part B 403 and Part C 405, in accordance with an exemplary embodiment. Exemplary assembly of components 400 which may be included in a base station, e.g., a gNB or an ng-eNB, such as the exemplary base station 300, e.g., a gNB or ng-eNB, of FIG. 3, and implement steps of an exemplary method, e.g., steps of the method of the flowchart 200 of FIG. 2.

Assembly of components 400 can be, and in some embodiments is, used in base station 300, e.g., a gNB or ng-eNB, of FIG. 3, base station 1 104 of FIG. 1, base station 2 106 of FIG. 1 and/or base station n 108 of FIG. 1. The components in the assembly of components 400 can, and in some embodiments are, implemented fully in hardware within the processor 302, e.g., as individual circuits. The components in the assembly of components 400 can, and in some embodiments are, implemented fully in hardware within the assembly of components 308, e.g., as individual circuits corresponding to the different components. In other embodiments some of the components are implemented, e.g., as circuits, within the processor 302 with other components being implemented, e.g., as circuits within assembly of components 308, external to and coupled to the processor 302. As should be appreciated the level of integration of components on the processor and/or with some components being external to the processor may be one of design choice. Alternatively, rather than being implemented as circuits, all or some of the components may be implemented in software and stored in the memory 310 of the base station 300, e.g., a gNB or ng-eNB, with the components controlling operation of the base station to implement the functions corresponding to the components when the components are executed by a processor, e.g., processor 302. In some such embodiments, the assembly of components 400 is included in the memory 310 as assembly of components 322. In still other embodiments, various components in assembly of components 400 are implemented as a combination of hardware and software, e.g., with another circuit external to the processor 302 providing input to the processor 302 which then under software control operates to perform a portion of a component's function. While processor 302 is shown in the FIG. 3 embodiment as a single processor, e.g., computer, it should be appreciated that the processor 302 may be implemented as one or more processors, e.g., computers.

When implemented in software the components include code, which when executed by the processor 302, configure the processor 302 to implement the function corresponding to the component. In embodiments where the assembly of components 400 is stored in the memory 310, the memory 310 is a computer program product comprising a computer readable medium comprising code, e.g., individual code for each component, for causing at least one computer, e.g., processor 302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 4 control and/or configure the base station 300, or elements therein such as the processor 302, to perform the functions of corresponding steps illustrated and/or described in the method of one or more of the flowcharts, signaling diagrams and/or described with respect to any of the Figures. Thus the assembly of components 400 includes various components that perform functions of corresponding one or more described and/or illustrated steps of an exemplary method, e.g., steps of the method of flowchart 200 of FIG. 2 and/or described or shown with respect to any of the other figures.

Assembly of components 400 includes a component 404 configured to receive, at the base station, a first paging request form a network node, e.g., an AMF, used to control paging of UE devices, said first paging request being a request to page a first UE device, and a component 410 configured to perform a paging operation to page the first UE device using unlicensed spectrum Component 410 includes a component 411 configured to set the variable transmission attempt equal to 1; a component 412 configured to perform a channel sensing operation, e.g., a LBT operation, to determine if the base station can transmit a paging signal to the first UE device using said unlicensed spectrum, a component 413 configured to control operation as a function of the determination as to whether or not the base station can transmit the paging signal to the first UE device using the unlicensed spectrum, a component 414 configured to determine if the configurable maximum number of transmission attempts has been reached, e.g., compare the current value of the variable transmission attempt to the maximum number of transmission attempts, and to control operation as a function of the determination, a component 415 configured to increment the variable transmission attempt, a component 416 configured to operate the base station to transmit a paging signal to said first UE device using said unlicensed spectrum, when the determination is that the base station can transmit the paging signal to the first UE device using the unlicensed spectrum, a component 420 configured to monitor to detect a response from said first UE device in response to the transmitted paging signal, and a component 424 configured to control the base station to refrain from transmitting a paging signal to said first UE device using said unlicensed spectrum, when the determination is that the base station can not transmit the paging signal to the first UE device using the unlicensed spectrum, e.g. because of the channel sensing condition operation determined that the unlicensed spectrum is currently unavailable. Component 416 includes a component 418 configured to transmit a paging message to said first UE device N number of times and/or repetitively during a predetermined time interval T. Component 420 includes a component 422 configured to receive a response from the first UE device in response to the transmitted paging signal.

Assembly of components 400 further includes a component 428 configured to determine whether the paging operation was successful or unsuccessful. Component 428 includes a component 430 configured to determine if a paging signal was transmitted to the first UE device as part of said paging operation. Component 430 includes a component 432 configured to determine that a paging signal was not transmitted to the first UE device, and a component 434 configured to determine that a paging signal was transmitted to the first UE device, e.g., based on an indication that component 416 operated the base station to transmit a paging signal. Component 428 further includes a component 436 configured to control operation as a function of the determination as to whether or not a paging signal was transmitted to the first UE device, a component 438 configured to determine that the paging operation was not successful in response to a determination that a paging signal was not transmitted to the first UE device. In some embodiments, component 438 stores information indicating that the paging operation was not successful due to a failure to transmit a paging signal, e.g., due to unlicensed spectrum being currently unavailable. In some embodiments, the stored information is a failure cause code indicating the reason of the failure. Component 428 further includes a component 440 configured to determine if a response was received by the base station in response to the paging signal transmitted to the first UE device, e.g., under the control of component 416, a component 442 configured to control operation as a function of the determination as to whether or not a response signal was received by the base station in response to the paging signal transmitted to the first UE device, a component 444 configured to determine that the paging operation was successful, when the determination is that response signal was received by the base station in response to the paging signal transmitted to the first UE device, and a component 446 configured to determine that the paging operation was not successful in response to a determination that a response signal was not received by the base station in response to the paging signal transmitted, e.g.

under the control of component 416, to the first UE device. In some embodiments, component 446 stores information indicating that the paging operation was not successful due to a failure to receive a paging response signal, e.g., the paging signal directed to the first UE device was transmitted by the base station, but the base station did not receive a response signal, e.g., because the first UE was not in the coverage area of the base station or the UE was powered off. In some embodiments, the stored information is a failure cause code indicating the reason of the paging operation failure is that the base station did not receive a paging response signal in response to a transmitted paging signal.

Assembly of components 400 further includes a component 450 configured to control operation as a function of the determination as to whether the paging operation was successful or unsuccessful, a component 452 configured to communicate a paging response, e.g., a paging response failure message, to the network node in response to said first paging request indicating that the paging operation was unsuccessful, in response to the base station determining that the paging operation was unsuccessful, and a component 454 configured to perform one of the following, in response to determining that the paging operation was unsuccessful: i) proceeding with normal base station operation without sending a paging response message to the network node in response to the first paging request or ii) sending a paging success response message to the network node in response to said first paging request.

Component 452 includes a component 456 configured to operate the base station to transmit a paging response to the first network node that includes a failure cause code indicating the reason that the paging operation failed.

Component 456 includes a component 458 configured to operate the base station, e.g., operate a transmitter in the base station, to transmit a paging response to the network node that includes a failure cause code indicating the reason that the paging operation failed was due to a failure by the base station to transmit the paging signal to the first UE device and a component 460 configured to operate the base station, e.g., operate a transmitter in the base station, to transmit a paging response to the network node that includes a failure cause code indicating the reason that the paging operation failed was due to a failure to receive a reply for the first UE device.

Figure 5:
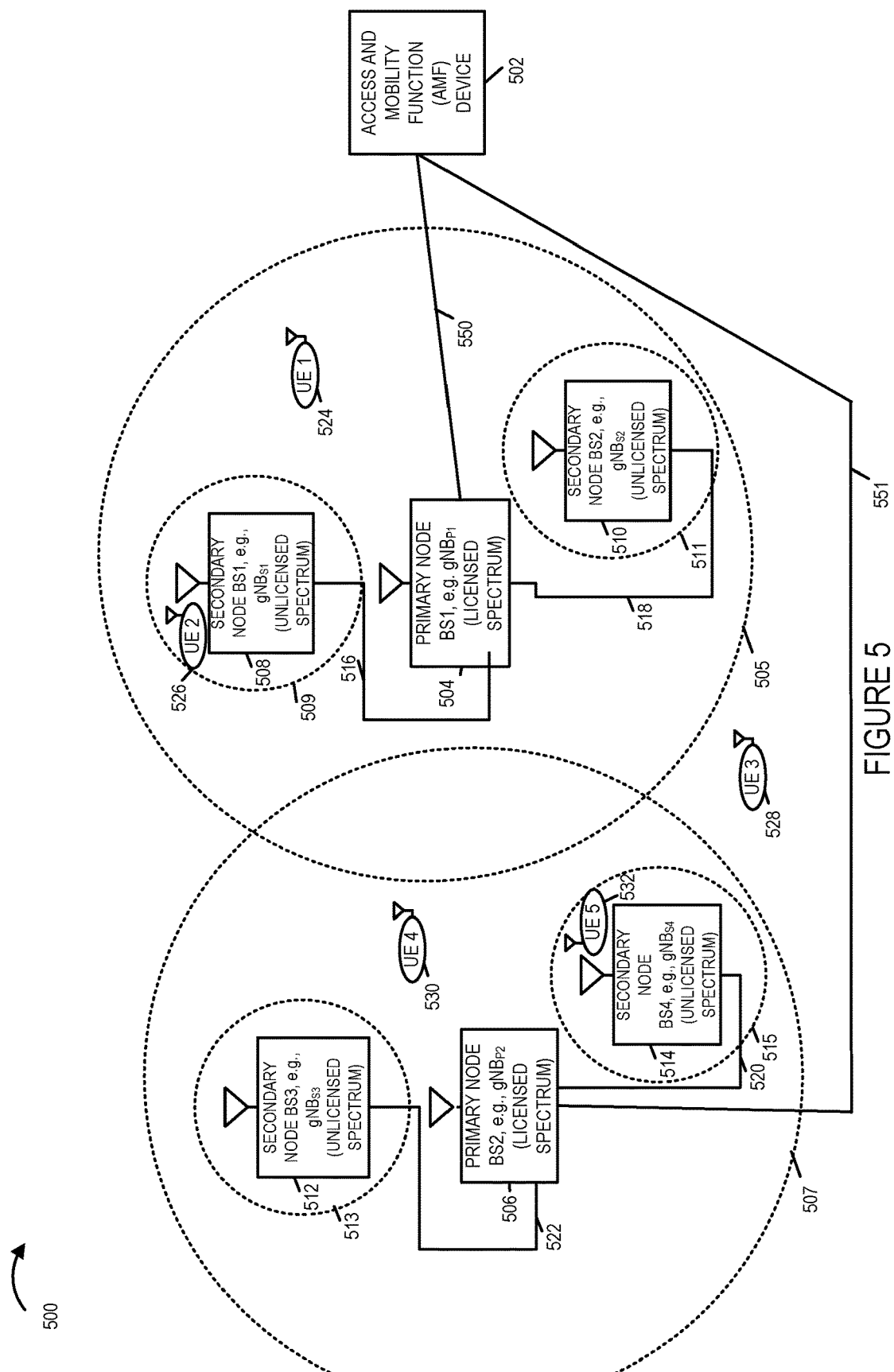
FIG. 5 is a drawing of an exemplary communications system using licensed and unlicensed spectrum in accordance with an exemplary embodiment.

FIG. 5 is a drawing of an exemplary communications system 500 using licensed and unlicensed spectrum in accordance with an exemplary embodiment. Communications system 500 includes an access and mobility function (AMF) device 502, primary node (PN) base station (BS) 1 504, e.g., gNBP1, primary node (PN) base station (BS) 2 506, e.g., gNBP2, secondary node (SN) base station (BS) 1 508, e.g., gNBS1, secondary node (SN) base station (BS) 2 510, e.g., gNBS2, secondary node (SN) base station (BS) 3 512, e.g., gNBS3, and secondary node (SN) base station (BS) 4 514, e.g., gNBS4, which are coupled together as shown in FIG. 5. Each base station (504, 506, 508, 510, 512, 514) has a corresponding wireless coverage area (505, 507, 509, 511, 513, 515). In this example, the PN base stations (504, 506) use licensed spectrum and a primary carrier, while the SN base stations (508, 510, 512, 514) use unlicensed spectrum and one or more secondary carriers. In this example, the SN base stations (508, 510, 512, 514) have been strategically deployed to fill in coverage gaps in the PN base stations (504, 506) coverage areas (505, 507), respectively. In some embodiments, the PN base stations (504, 506), may and sometimes do, use unlicensed spectrum.

AMF device 502 is coupled to PN BS 1 504 via communications link 550. AMF device 502 is coupled to PN BS 2 506 via communications link 551. PN BS 1 504 is coupled to SN BS 1 508 via communications link 516. PN BS 1 504 is coupled to SN BS 2 510 via communications link 518. PN BS 2 506 is coupled to SN BS 3 512 via communications link 522. PN BS 2 506 is coupled to SN BS 4 514 via communications link 520.

Exemplary communications system 500 further includes a plurality of user equipment (UE) devices (UE 1 524, UE 2 526, UE 3 528, UE 4 530, UE 5 532), which may move through the communications system. In FIG. 5, UE 1 524 is shown to be within an area which can be reached by a paging signal from PN BS 1 504; UE 2 526 is shown to be within an area which can be reached by a paging signal from SN BS 1 508; UE 3 528 is shown to be within an area which cannot be reached by a paging signal; UE 4 530 is shown to be within an area which can be reached by a paging signal from PN BS 2 506; and UE 5 532 is shown to be within an area which can be reached by a paging signal from SN BS 4 514.

Figure 6:
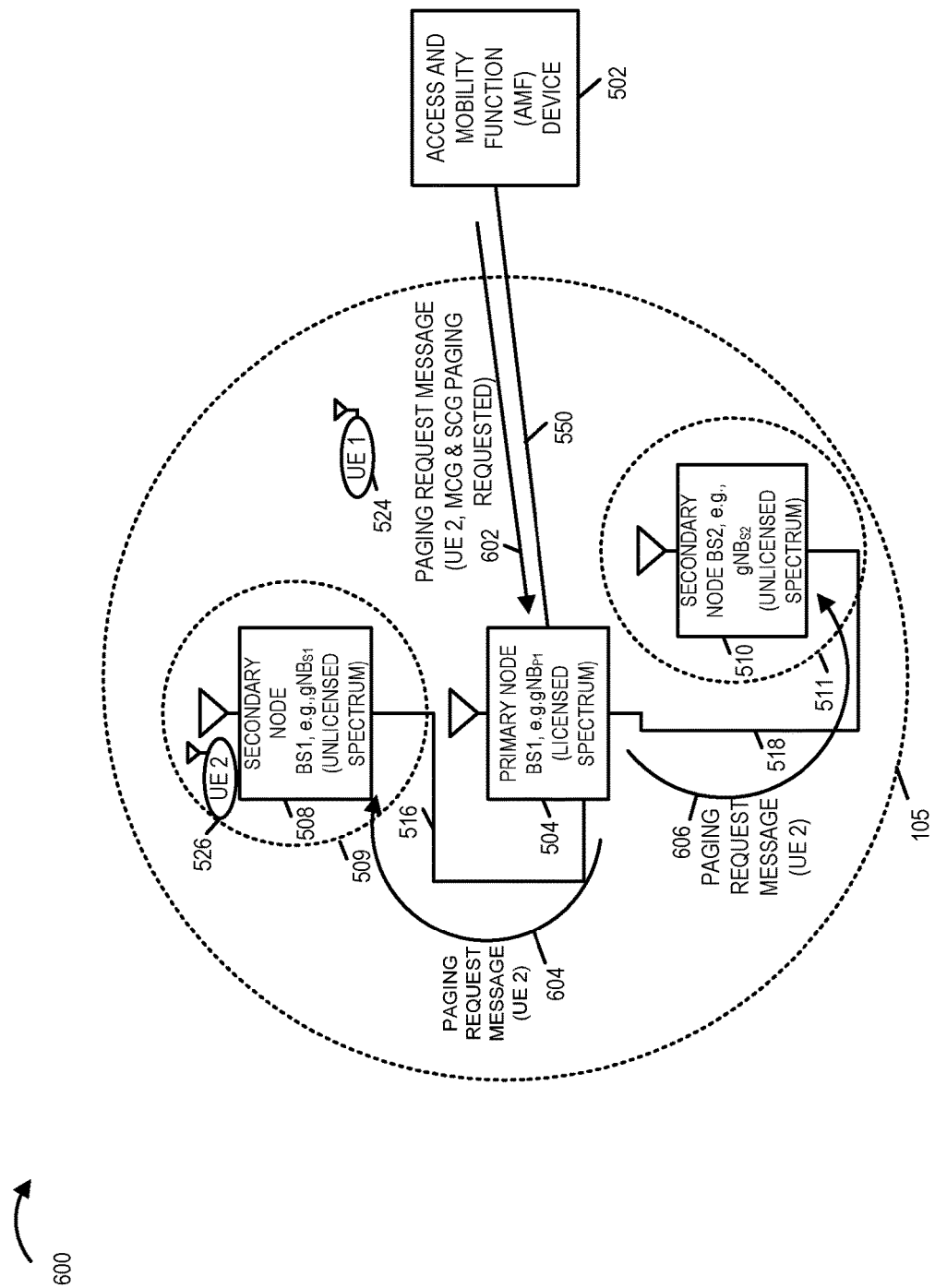
FIG. 6 illustrates an exemplary paging request for paging a user equipment (UE) device being communicated from an access and mobility function (AMF) to a primary node (PN) base station (e.g. a macro base station) and exemplary paging requests for paging the UE being communicated from the PN base station to secondary node (SN) base stations (e.g. a small cell base station) in accordance with an exemplary embodiment.
Figure 7:
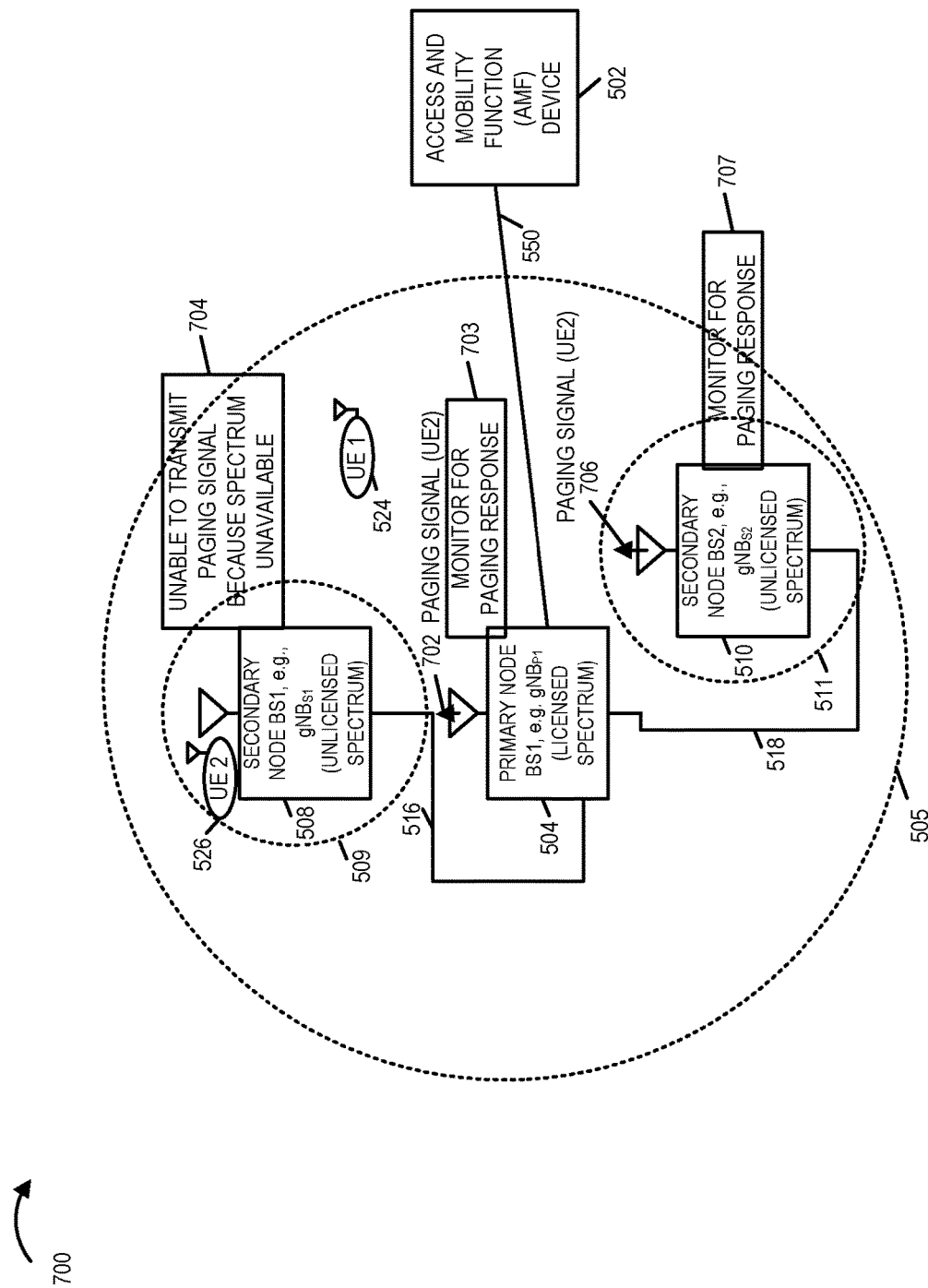
FIG. 7 illustrates exemplary paging attempts of the UE being performed at base stations concurrently using licensed and unlicensed spectrum.
Figure 8:
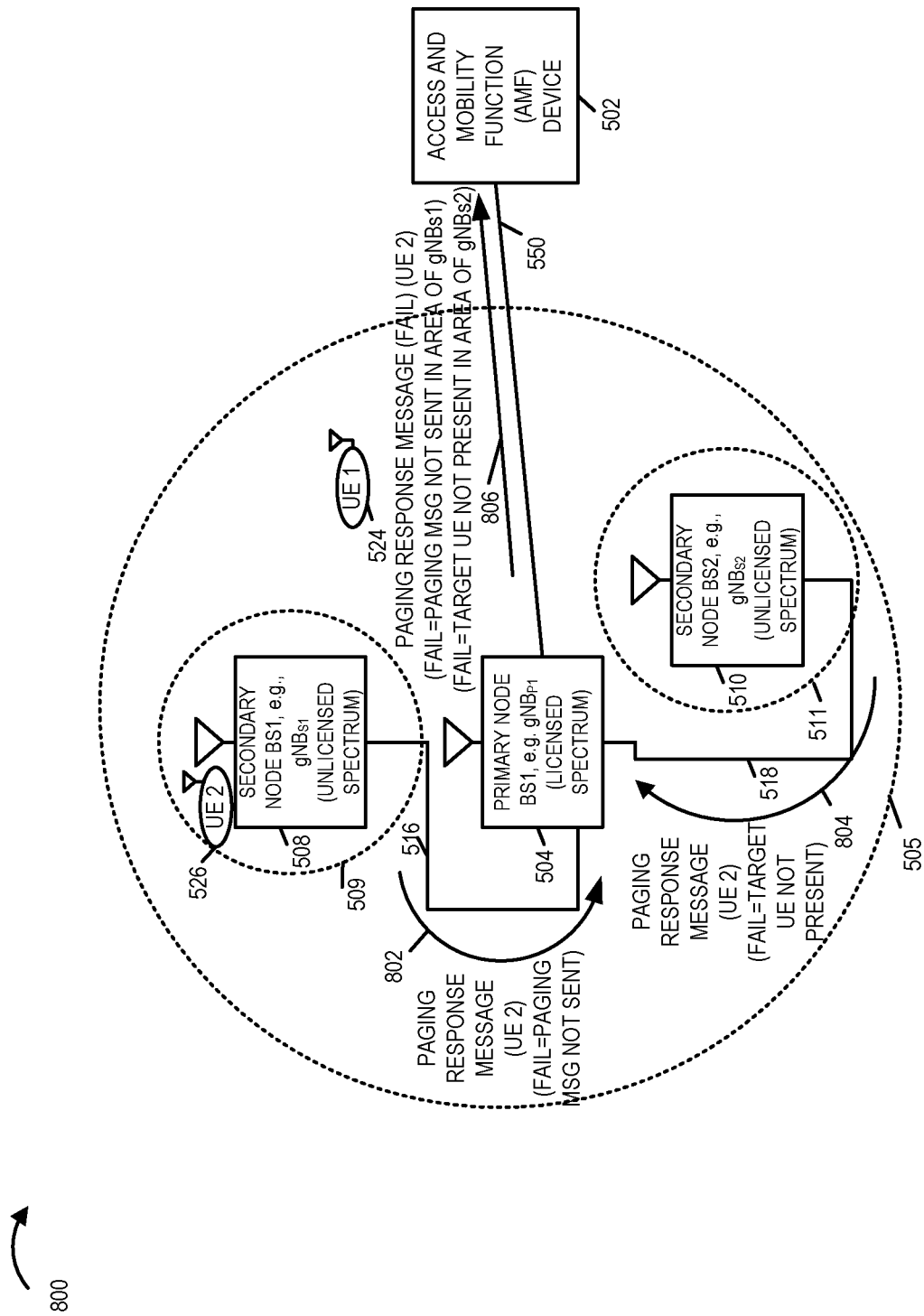
FIG. 8 illustrates exemplary paging response messages including fault code information being communicated from SN base stations to the PN base station, and from the PN base station to the AMF device, in accordance with an exemplary embodiment.

FIG. 6-8 illustrate an exemplary paging attempt in accordance with an exemplary embodiment corresponding to the system 500 of FIG. 5. In FIG. 6, AMF device 502 generates and sends a paging request message 602 to PN BS 1 504. The paging request message 602 includes information identifying that UE 2 is to paged, and further includes information communicating that the paging is to be performed for both the master carrier group and secondary carrier group base stations. In this example, PN BS 504 uses the master carrier which is a primary carrier using licensed spectrum, and the SN BSs 508, 510, use one or more secondary carriers using unlicensed spectrum.

PN BS 1 504 receives the paging request message 602, recovers the communicated information, determines that it is to page for UE 2 and that SN BSs 506 and 508 are also to page for UE 2, generates paging request messages 604, 606 including information identifying that UE 2 is the paging target, and sends paging request messages (604, 606) to SN BSs (508, 510), respectively, which receive the messages (604, 606) and recover the communicated information.

In drawing 700 of FIG. 7, PN BS 1 504 generates and transmits paging signal 702, which is paging UE 2, using the primary carrier in licensed spectrum. PN BS 1 504 monitors for a paging response from UE 2 in response to the transmitted paging signal, as indicated by block 703. In some embodiments, the paging signal 702 may be transmitted a predetermined number of times or during a predetermined time interval, assuming no response is received.

In drawing 700 of FIG. 7, SN BS 1 508 attempts to transmit a paging signal using unlicensed spectrum. However, SN BS 1 508 is unable to transmit a paging signal to UE 2 because the unlicensed spectrum is currently unavailable, e.g., based on the results of a channel sensing operation which is performed, as indicated by block 704.

In drawing 700 of FIG. 7, SN BS 2 510 generates and transmits paging signal 706, which is paging UE 2, using a secondary carrier in unlicensed spectrum. PN BS 2 504 monitors for a paging response from UE 2 in response to the transmitted paging signal, as indicated by block 707. In some embodiments, the paging signal 706 may be transmitted a predetermined number of times or during a predetermined time interval, assuming no response is received.

FIG. 8 includes drawing 800 which illustrates exemplary paging response messages (802, 804, 806) in accordance with an exemplary embodiment. SN BS 1 508 generates and sends paging response message 802 to PN BS 1 504, in response to paging request message 604. Paging response message 802 includes information communicating that the paging attempt to page UE 2 failed and the reason of the failure was that a paging message was not sent by SN BS 1 508, e.g., because the unlicensed spectrum was unavailable. SN BS 2 510 generates and sends paging response message 804 to PN BS 1 504, in response to paging request message 606. Paging response message 804 includes information communicating that the paging attempt to page UE 2 failed and the reason of the failure was that the target UE, which is UE 2, did not respond to the transmitted paging signal, i.e., the target UE was not present in the coverage area 511.

PN BS 1 504 receives the response messages (802, 804), recovers the communicated information, and generates a paging response message 806 based on the information in response messages 802, 804 and based on its own paging results for UE 2 in licensed spectrum, which also resulted in failure. Paging response message 806 includes information communicating that the paging attempt to page UE 2 failed and further includes information identifying the reason for failure in each of secondary coverage areas, which use unlicensed spectrum. Thus paging response message includes a failure code, corresponding to SN BS 1 508, indicating that a paging message was not sent in the area of SN BS 1 508 (e.g., because unlicensed spectrum was not available), and a failure code, corresponding to SN BS 2 510, indicating that the target UE, which is UE 2, was not present in the area of SN BS 2 (e.g., SN BS 2 510 transmitted a paging signal in unlicensed spectrum but received no response from UE 2).

MS BS 1 504 sends response message 806 to AMF device 502 in response to the paging request message 602. The AMF 502 receives message 806, recovers the communicated information, and uses the information to make future paging request decisions, e.g., the AMF 502 implements an efficient paging escalation strategy as a function of one or more received failure codes.

In some embodiments, a paging message is sent to the Primary node (PN) als primary gNB or ng-eNB and Secondary Nodes (SN) als secondary gNB or ng-eNB.

Some aspects and/or feature of an exemplary case 1: NR-U DC (new radio-unlicensed dual connectivity) operation will be discussed below. In some embodiment, if PN (gNB or ng-eNB) is allowed to instruct SN (gNB or ng-eNB) to page in addition to itself, then it does so. Therefore, PN and any selected SNs (by PN) will start paging the identified UE(s). This could, and sometimes does, include licensed and unlicensed carriers. In some embodiments, each SN node will attempt to re-transmit the page message N number of times and/or for T duration. Should no response be received from the UE and/or the paging message was not sent due to LBT not clearing for unlicensed carriers, involved SNs will send a novel paging response message, e.g., Xn-A:PAGING_U RESPONSSE message to PN over Xn. Once PN has received Xn-AP:PAGIN_U RESPONSE msg from some or all SNs, PN decides to send a paging responses message to AMF, e.g., N2-AP:PAGING_U RESPONSE to AMF, indicating appropriate cause code (UE not responding Or Message not sent due to non-availability of unlicensed channels).

The criteria for how the PN selects SNs to instruct to page is up to the particular implementation. It can, and sometimes does, depend on various things including: a) indicator from AMF as to whether paging via SN is allowed, and/or b) radio network planning data.

Some aspects and/or feature of an exemplary case 2: NR-U SA (new radio-unlicensed stand alone) operation will be discussed below. Case 2 is similar to case 1, except there is only PN; there are no SNs. Therefore no X2 signaling is required.

Figure 9:
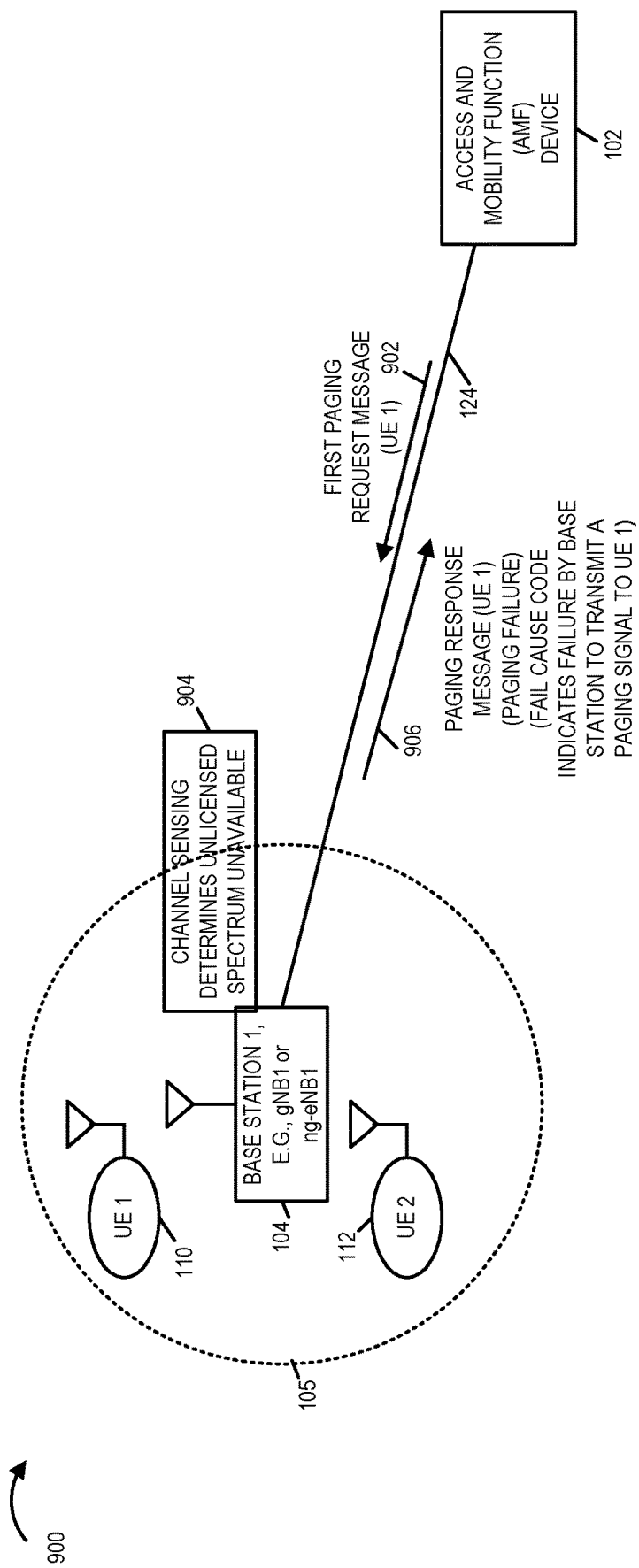
FIG. 9 illustrate an exemplary paging attempt in which the paging attempt fails due to unavailable unlicensed spectrum in accordance with an exemplary embodiment.

FIG. 9 is a drawing 900 which illustrate an exemplary paging attempt, corresponding to the system 100 of FIG. 1, in which the paging attempt fails due to unavailable unlicensed spectrum in accordance with an exemplary embodiment. AMF device 102 generates and sends first paging request message 902, which indicates that UE 1 110, is to be paged, to base station 1 104, which uses unlicensed spectrum. Base station 1 104 receives the paging request message 902 and attempts to page UE 1 110. As part of the paging attempt, BS 1 104 performs a channel sensing operation which determines that the unlicensed spectrum is unavailable for BS 104 to use at the present time, as indicated by box 904. Therefore BS 1 104 is unable to transmit a paging signal in the unlicensed spectrum to page UE 1 110. In some embodiments BS 1 104 repeats the channel sensing operation to see if the unlicensed spectrum has become available until a predetermined time interval expires, in which case the base station determines that the paging attempt is unsuccessful due to a failure by BS 1 104 to transmit a paging signal. Base station 1 104 generates and sends paging response message 906 to AMF device 102. The paging response message 906 indicates the paging attempt for UE 1 was a failure and the paging response message 906 includes a failure cause code indicating the failure is due to a failure by the base station to transmit a paging signal to UE 1. AMF device 102 receives paging response message 102 and recovers the communicated information. Thus the AMF 102 is aware the base station 104 was unable to transmit a paging signal, and may send another paging request at a later time.

Figure 10:
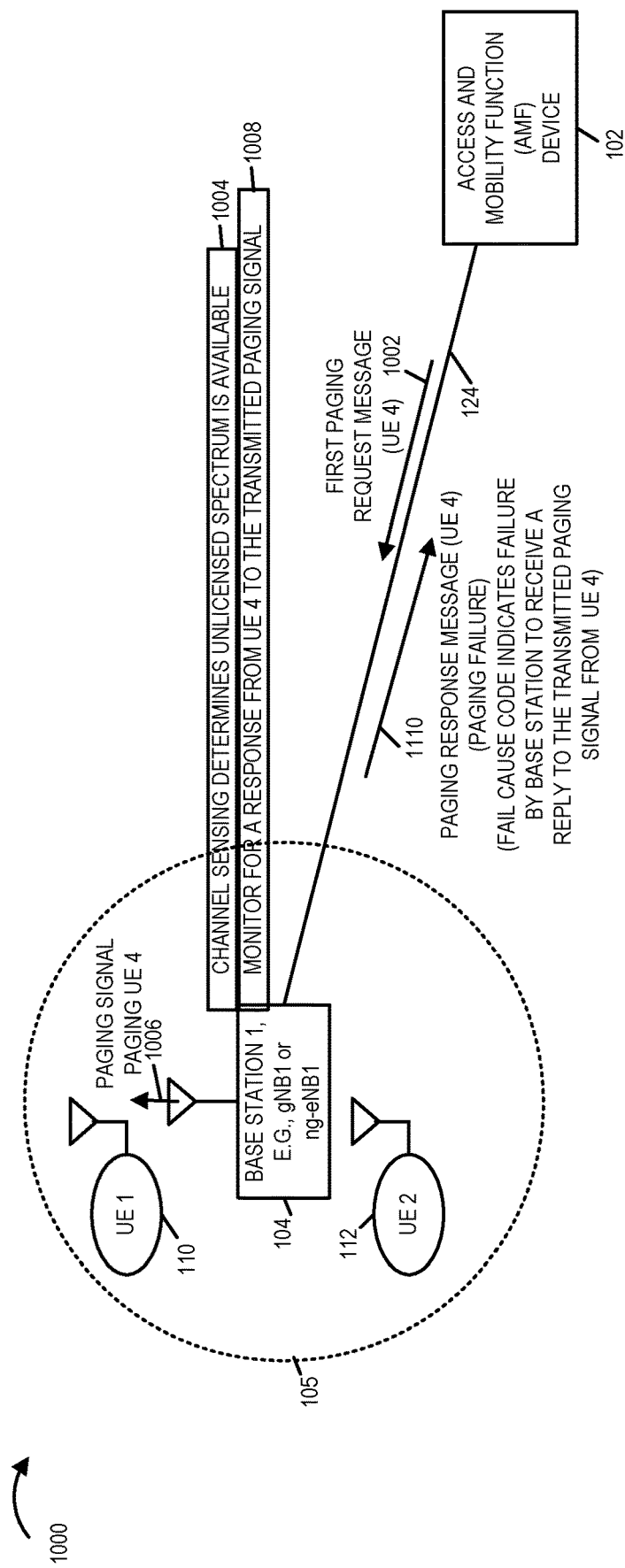
FIG. 10 illustrate an exemplary paging attempt in which the paging attempt fails due to no response from the UE device being paged in accordance with an exemplary embodiment.

FIG. 10 is a drawing 1000 which illustrate an exemplary paging attempt, corresponding to system 100 of FIG. 1, in which the paging attempt fails due to no response from the UE device being paged in accordance with an exemplary embodiment. AMF device 102 generates and sends first paging request message 1002, which indicates that UE 4 116, is to be paged, to base station 1 104, which uses unlicensed spectrum. Base station 1 104 receives the paging request message 1002 and attempts to page UE 4 116. As part of the paging attempt, BS 1 104 performs a channel sensing operation which determines that the unlicensed spectrum is available for BS 104 to use at the present time, as indicated by box 1004. Therefore BS 1 104 generates and transmits a paging signal 1006 in the unlicensed spectrum to page UE 4 116. Base station 1 104 monitors for a response from UE 4 to the transmitted paging signal 1008. In some embodiments BS 1 104 repetitively transmits the paging signal for a predetermined number of time or until a predetermined time interval expires, in which case the base station determines that the paging attempt is unsuccessful due to a failure to detect a response signal from UE 4 116. In the example of FIG. 10, UE 4 116 is not currently in the coverage area 105 of base station 1 104; therefore, UE 4 116 does not receive paging signal 1006 and does not send a response signal. Base station 1 104 generates and sends paging response message 1010 to AMF 102, in response to first paging request message 1002. Paging response message 1010 indicates that the paging attempt to page UE 4 was a failure and the paging response message 1010 includes a failure cause code indicating that the failure is a failure by the base station to receive a reply from the paging target UE, which is UE 4, to the transmitted paging signal 1006. AMF 102 receives paging response message 1108 and recovers the communicated information. The AMF 102 is now aware that the paging attempt failed due to UE 4 not being in the coverage area of BS 1 104, and the AMF can make an intelligent choice to send to a paging request for UE 4 to another area in which UE may be located since the region 105, corresponding to BS 1 104, has been eliminated.

Figure 11:
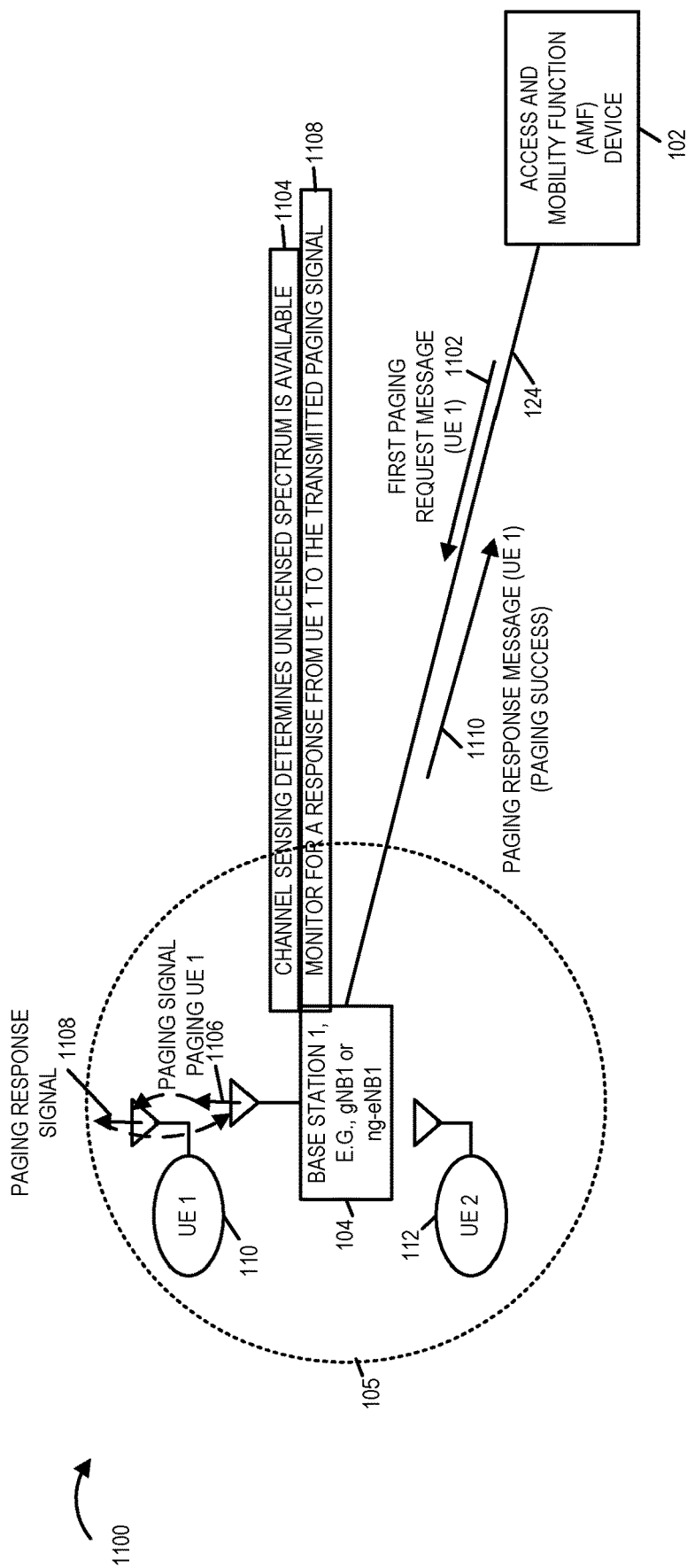
FIG. 11 illustrates an exemplary paging attempt in which the paging attempt is a success in accordance with an exemplary embodiment.

FIG. 11 is a drawing 1100 which illustrate an exemplary paging attempt, corresponding to the system 100 of FIG. 1, in which the paging attempt is a success in accordance with an exemplary embodiment. AMF device 102 generates and sends first paging request message 1102, which indicates that UE 1 110, is to be paged, to base station 1 104, which uses unlicensed spectrum. Base station 1 104 receives the paging request message 1102 and attempts to page UE 1 110. As part of the paging attempt, BS 1 104 performs a channel sensing operation which determines that the unlicensed spectrum is available for BS 104 to use at the present time, as indicated by box 1104. Therefore BS 1 104 generates and transmits a paging signal 1106 in the unlicensed spectrum to page UE 1 110. Base station 1 104 monitors for a response from UE 1 110 to the transmitted paging signal 1106. In the example of FIG. 11, UE 1 110 is currently in the coverage area 105 of base station 1 104; therefore, UE 1 110 does receive paging signal, and UE 1 110 generates and transmits paging response signal 1108 to base station 1 104. Base station 1 104 receives the paging response signal 1108. Base station 1 104 generates and sends paging response message 1110 to AMF 102, in response to first paging request message 1102. Paging response message 1110 indicates that the paging attempt to page UE 1 was a success. AMF 102 receives paging response message 1110 and recovers the communicated information.

Figure 12:
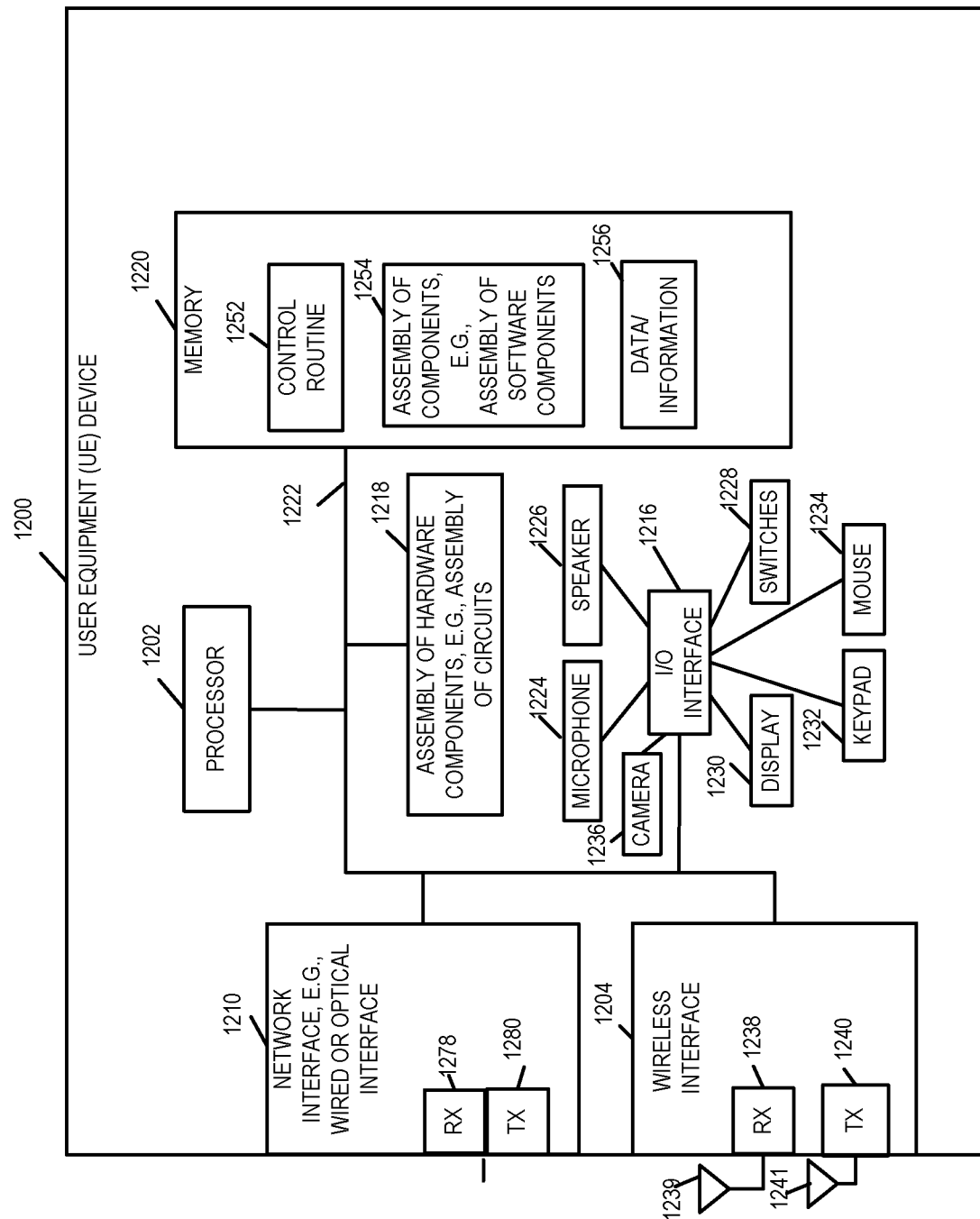
FIG. 12 is a drawing of an exemplary user equipment (UE) device implemented in accordance with an exemplary embodiment.

FIG. 12 is a drawing of an exemplary user equipment (UE) device 1200 implemented in accordance with an exemplary embodiment. UE device 1200 is, e.g. one of the UE devices (110, 112, 114, 116, 118, 120, 122) of system 100 of FIG. 1 or one of the UE devices (524, 526, 528, 530, 532) of system 500 of FIG. 5. UE device 1200 includes a processor 1202, a wireless interface 1204, a network interface 1210, an I/O interface 1216, an assembly of hardware components 1218, e.g., an assembly of circuits, and memory 1220 coupled together via a bus 1222 over which the various elements may interchange data and information. Wireless interface 1204 includes a wireless receiver 1238 coupled to receive antenna 1239, via which the UE may receive wireless signals, e.g., wireless downlink signals from a base station, e.g., a gNB. An exemplary signal received by receiver 1238 is a paging signal from a base station which was communicated over unlicensed spectrum. Wireless interface 1204 includes a wireless transmitter 1240 coupled to transmit antenna 1241, via which the UE may transmit wireless signals, e.g., wireless uplink signals to a base station, e.g., a gNB. An exemplary signal transmitted by transmitter 1240 is a paging response signal to a base station. Network interface 1210, e.g., a wired or optical interface 1210 includes a receiver 1278 and a transmitter 1280.

UE device 1200 further includes a microphone 1224, a speaker 1226, switches 1228, a mouse 1234, a keypad 1232, a display 1230 and a camera 1236 coupled to I/O interface 1216, via which the various input/output devices (1224, 1226, 1228, 1230, 1232, 1234, 1236) may communicate with the other elements (1202, 1204, 1210, 1218, 1220) of the UE device. Memory 1220 includes a control routine 1252, an assembly of components 1254, e.g., an assembly of software components, and data/information 1256.

Figure 13:
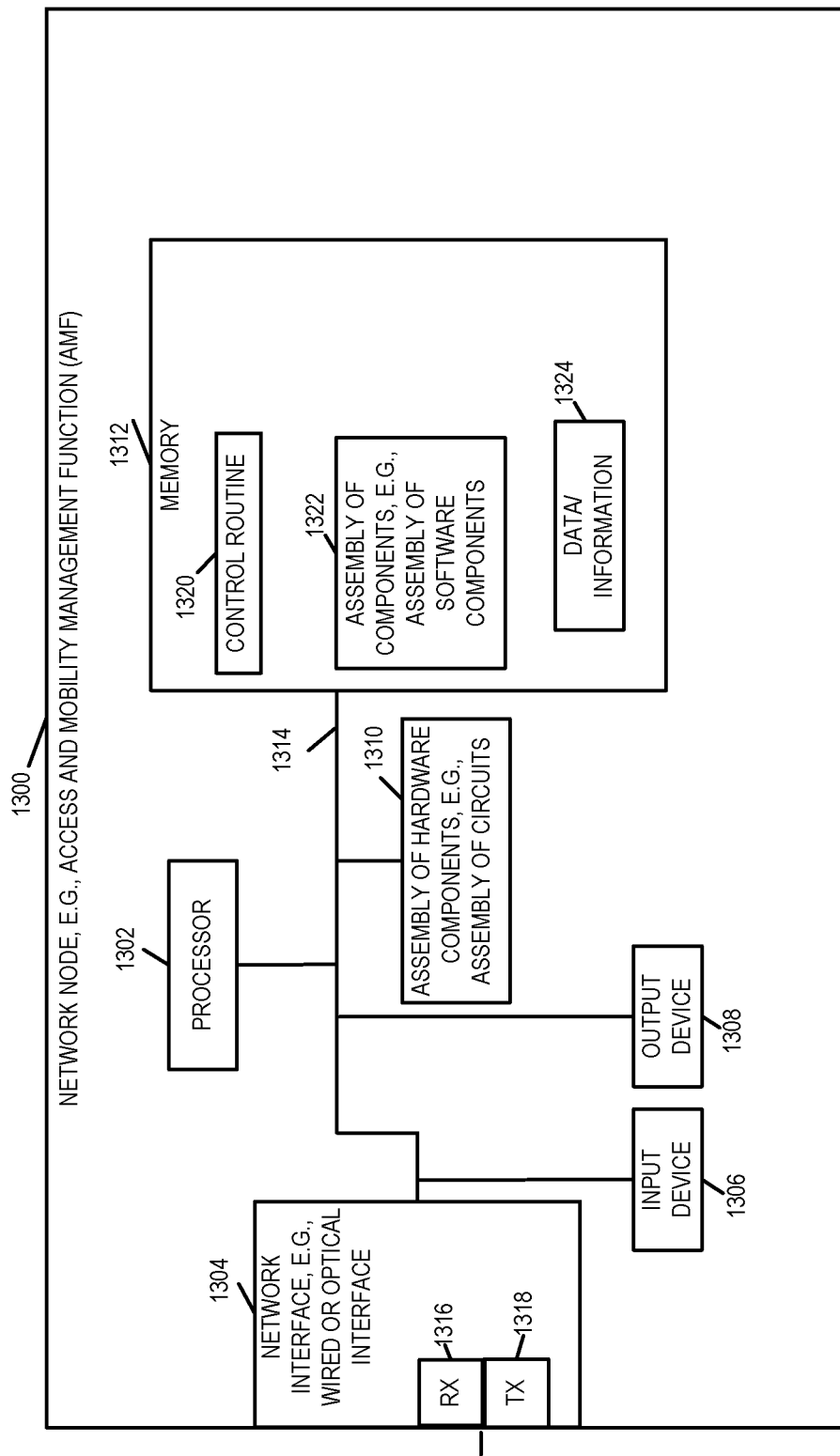
FIG. 13 is a drawing of an exemplary network node, e.g., an AMF, implemented in accordance with an exemplary embodiment.

FIG. 13 is a drawing of an exemplary network node 1300, e.g., an AMF, implemented in accordance with an exemplary embodiment. Exemplary network node 1300 is, e.g., AMF device 102 of system 100 of FIG. 1 or AMF device 502 of system 500 of FIG. 5. Network node 1300 includes a processor 1302, e.g., a CPU, a network interface 1304, an input device 1306, e.g., a keyboard, an output device 1308, e.g., a display, an assembly of hardware components 1310, e.g., an assembly of circuits, and memory 1312 coupled together via a bus 1314 over which the various elements may interchange data and information. Network interface 1304, e.g., a wired or optical interface, includes a receiver 1316 and a transmitter 1318, via which network node 00 may communicate with other devices, e.g., a base station, another core network element, etc., via a backhaul network. Memory 1312 includes a control routine 1320, an assembly of components 1322, e.g., an assembly of software components, and data/information 1324.

Figures 14, 14B:
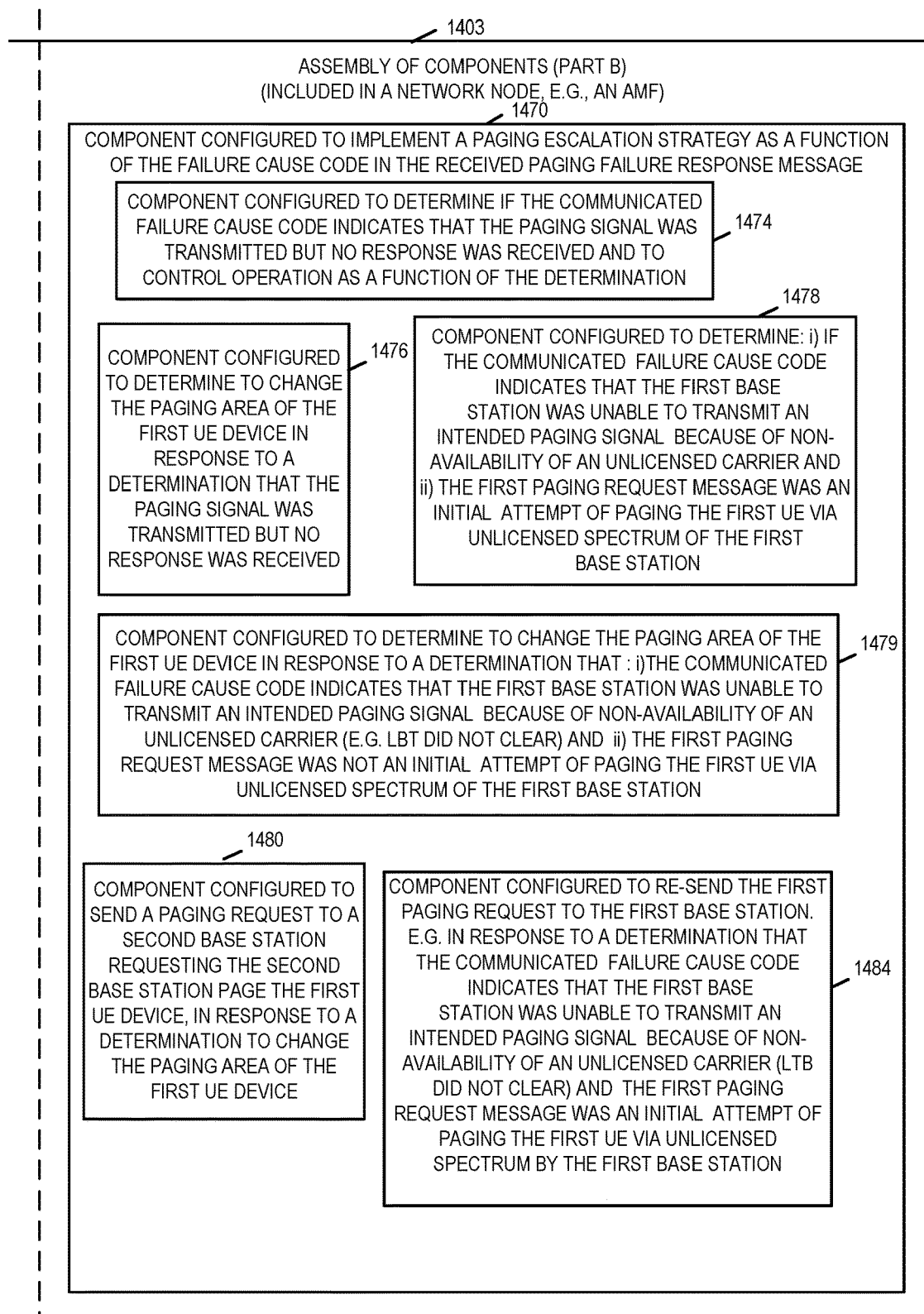
FIG. 14B is a second part of an exemplary assembly of components which may be included in a network node, e.g., an AMF, implemented in accordance with an exemplary embodiment.
FIG. 14 comprises the combination of FIG. 14A and FIG. 14B.
Figure 14A:
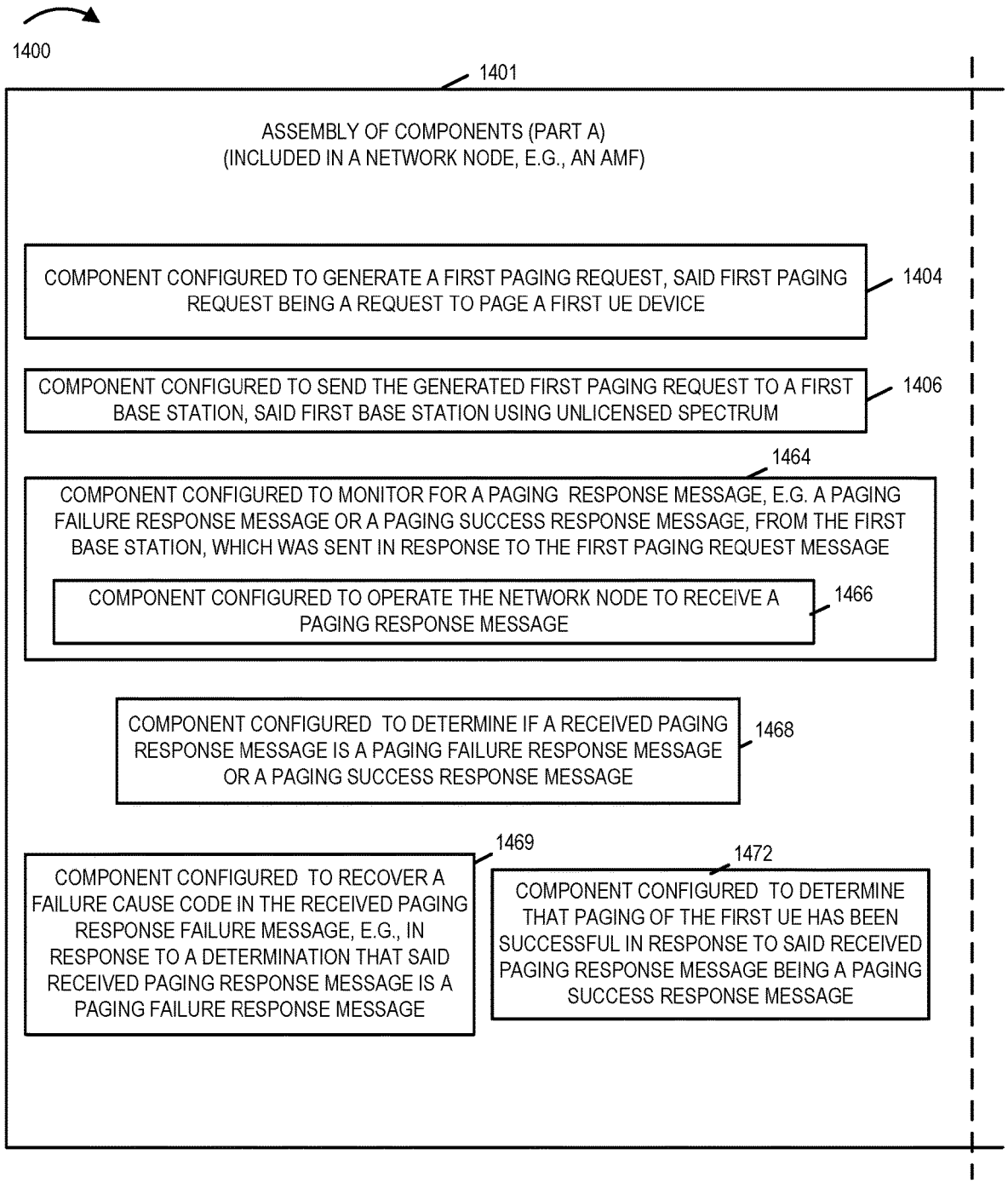
FIG. 14A is a first part of an exemplary assembly of components which may be included in a network node, e.g., an AMF, implemented in accordance with an exemplary embodiment.

FIG. 14, comprising the combination of FIG. 14A and FIG. 14B, is a drawing of an exemplary assembly of components 1400, comprising Part A 1401 and Part B 1403, in accordance with an exemplary embodiment. Exemplary assembly of components 1400 may be, and sometimes is, included in an exemplary network node, e.g., network node 1300, e.g., an AMF, of FIG. 13, or network node 102, e.g., an AMF, of system 100 of FIG. 1 or AMF 502 of system 500 of FIG. 5, and implement steps of an exemplary method, e.g., steps of the method of the flowchart 200 of FIG. 2.

The components in the assembly of components 1400 can be, and in some embodiments are, implemented fully in hardware within the processor 1302, e.g., as individual circuits. The components in the assembly of components 1400 can, and in some embodiments are, implemented fully in hardware within the assembly of components 1310, e.g., as individual circuits corresponding to the different components. In other embodiments some of the components are implemented, e.g., as circuits, within the processor 1302 with other components being implemented, e.g., as circuits within assembly of components 1310, external to and coupled to the processor 1302. As should be appreciated the level of integration of components on the processor and/or with some components being external to the processor may be one of design choice. Alternatively, rather than being implemented as circuits, all or some of the components may be implemented in software and stored in the memory 1312 of the network node 1300, e.g., an AMF, with the components controlling operation of the network node to implement the functions corresponding to the components when the components are executed by a processor, e.g., processor 1302. In some such embodiments, the assembly of components 1400 is included in the memory 1312 as assembly of components 1322. In still other embodiments, various components in assembly of components 1400 are implemented as a combination of hardware and software, e.g., with another circuit external to the processor providing input to the processor 1302 which then under software control operates to perform a portion of a component's function. While processor 1302 is shown in the FIG. 13 embodiment as a single processor, e.g., computer, it should be appreciated that the processor 1302 may be implemented as one or more processors, e.g., computers.

When implemented in software the components include code, which when executed by the processor 1302, configure the processor 1302 to implement the function corresponding to the component. In embodiments where the assembly of components 1400 is stored in the memory 1312, the memory 1312 is a computer program product comprising a computer readable medium comprising code, e.g., individual code for each component, for causing at least one computer, e.g., processor 1302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 14 control and/or configure the network node 1300, or elements therein such as the processor 1302, to perform the functions of corresponding steps illustrated and/or described in the method of one or more of the flowcharts, signaling diagrams and/or described with respect to any of the Figures. Thus the assembly of components 1400 includes various components that perform functions of corresponding one or more described and/or illustrated steps of an exemplary method, e.g., steps of the method of flowchart 200 of FIG. 2 and/or described or shown with respect to any of the other figures.

Assembly of components 1400 includes a component 1404 configured to generate a first paging request, said first paging request being a request to page a first UE device, a component 1406 configured to send the generated first paging request to a first base station using unlicensed spectrum, and a component 1464 configured to monitor for a paging response message, e.g., a paging failure response message or a paging success response message, from the first base station, which was sent to the network node in response to the first paging request message. Component 1464 includes a component 1466 configured to operate the network node to receive a paging response message.

Assembly of component 1400 further includes a component 1468 configured to determine if a received paging response message is a paging failure response message or a paging success response message, a component 1469 configured to recover a failure cause code communicated in the received paging response failure message, e.g., in response to a determination that the received paging response message is a paging failure response message, and a component 1472 configured to determine that the paging of the first UE has been successful in response to said received paging response message being a paging success response message.

Assembly of component 1400 further includes a component 1470 configured to implement a paging escalation strategy as a function of the failure cause code in the received paging failure response message. Component 1470 includes a component 1474 configured to determine if the communicated failure cause code indicates that the paging signal was transmitted but no response was received and to control operation as a function of the determination, a component 1476 configured to determine to change the paging area of the first UE device in response to a determination that the paging signal was transmitted, e.g., to the first UE device, but no response was received, e.g., from the first UE device, and a component 1478 configured to determine if: i) the communicated failure cause code indicates that the first base station was unable to transmit an intended paging signal because of non-availability of an unlicensed carrier and ii) the first paging request message was an initial attempt of paging the first UE via the unlicensed spectrum of the first base station. Assembly of components 1400 further includes a component 1479 configured to determine to change the paging area of the first UE device in response to a determination that: i) the communicated failure cause code indicates that the first base station was unable to transmit an intended paging signal because of non-availability of an unlicensed carrier and ii) the first paging request message was not an initial attempt of paging the first UE device via unlicensed spectrum of the first base station. Assembly of components 1400 further includes a component 1480 configured to send a paging request to a second base station requesting the second base station to page the first UE device, in response to a determination to change the paging area of the first UE device, and a component 1484 configured to re-send the first paging request to the first base station, e.g., in response to a determination that the communicated failure cause code indicates that the first base station was unable to transmit an intended paging signal because of non-availability of an unlicensed spectrum and ii) the first paging request message was an initial attempt of paging the first UE device via unlicensed spectrum of the first base station.

Various aspects and/or features are described below. Various aspects and/or features of paging in some embodiments of new radio (NR) will now be described. In some embodiments, Core network (CN)-based paging operations in NR are similar to Long Term Evolution (LTE). For RRC_IDLE UEs, Access and Mobility Management Function (AMF) informs NG-RAN node (either gNB or ng-eNB) to initiate paging for the UE identified via 5G-S-TMSI in certain cells/Tracking area (TA) via N2-AP: PAGIN message. NG-RAN node pages target UEs via RRC:PAGING message. If target UEs do not respond to the page in a certain time duration, then AMF can re-initiate paging. At this juncture, paging escalation strategies may be applied, e.g., previous page msg was restricted to few cells in one TA, but re-paging may involve increasing the paging area to e.g., all cells in that tracking area or all cells in multiple TAs, etc.

NR introduces RAN-based paging operations based on I-RNTI to accommodate reaching UEs in the new RRC_INACTIVE state. In case of DC operations in NR (EN-DC, NGEN-DC or MR-DC), paging operation is currently performed only on primary carrier (MCG) which uses licensed spectrum.

It is important to note that unlike most other RAN-CN messages, the N2-AP:PAGING message has no N2-AP response event. In accordance with a feature of some embodiments of the present invention, a response message is added, e.g., a base station such as gNB, transmits a response message to network node such as an AMF node, in response to a paging request message.

Various aspects and/or features of some embodiments of new radio unlicensed spectrum (NR-U) will now be described. NR in Unlicensed Spectrum (NR-U) SID which is being studied in 3GPP Rel-15/16 has the following 3 flavours: Carrier Aggregated (CA), Dual Connectivity (DC), and Standalone (SA). Carrier Aggregated (CA) is similar to LTE-LAA and applies to both LTE- and NR-primary carrier licensed spectrum. Dual Connectivity (DC) applies to both LTE- and NR-primary carrier in licensed spectrum. Standalone (SA) NR-U applies only to NR and no licensed carrier exists; present day may use WiFi.

Among other operations, the paging operation would need to be defined for NR-U SA. Note that paging mechanisms defied for NR will apply to NR-U CA and DC case with some modifications required. IPR on "porting" NR paging operations to NR-U SA are assumed to exist.

Various problems related to paging will now be described. A first issue will now be described. For NR-U, sending any messages over unlicensed medium comes with the uncertainty of not having access to the physical medium for transmission at the desired time of transmission. If NR-U SA paging operations use NR paging operations as the baseline, it would be safe to assume that if target UE(s) do not respond to the paging, then AMF will re-initiate paging but it will escalate to a wider area. But, AMF would not have the knowledge of whether target UE(s) are not responding to CN pages because: i) target UE(s) are not present in the area being paged or ii) paging message was not sent (access to medium was not gained).

A second issue will now be described. For NR-U DC operations, primary carrier (MSG) coverage (using FR1 or FR2) can be expected to cover unlicensed secondary carrier(s) (SGC) coverage area. However, that may not always be true for either hot-spot type deployment where unlicensed carriers are deployed to fill FR1 coverage gaps and/or for coverage extension. For non-overlapping coverage areas, if UE is not in the coverage area of the primary cell, but is in secondary carrier (on unlicensed spectrum), then paging will have to be unnecessarily escalated to multiple primary cells, e.g., more than 1 tracking area (TA) to get to the UE.

A solution to the first issue will now be described. In accordance with a feature of some embodiments of the present invention, a new Class 1 N2-AP:PAGING_U message with a corresponding N2-AP:PAGING_U RESPONSE message including a failure cause code is implemented. Thus, in accordance with a feature of some embodiments of the present invention, a base station, e.g., a gNB, generates and sends a paging response to the network node, e.g., an AMF node, indicating the reason for the paging failure. Thus the AMF is provided, in accordance with the present invention, will knowledge of why the target UEs which are being paged are not responding to the core network (CN) pages.

A solution to the second issue will now be described. In some embodiments implemented in accordance with the present invention, paging operations on (unlicensed) Secondary unlicensed carrier(s) are implemented. Some such embodiments are implemented to support the capability of exchanges between UE, NG-RAN, e.g., a gNB, and 5GC, e.g., a AMF, to support paging over (unlicensed) Secondary carrier(s). In some embodiments, a new IE is implemented and used to enable/disable (unlicensed) Secondary carrier(s) paging during RRC_IDLE/RRC_INTERACTIVE→RRC_CONNECTED transitions. In some embodiments, a new IE is implemented and used in N2-AP:PAGING msg to control whether a given PAGING message goes on MCG or SCGs or both. In some embodiments, UE enhancements are implemented and used to automatically disable listening for pages on (unlicensed) Secondary carrier(s) if no pages are received in a certain time window.

Numbered List of Exemplary Method Embodiments:

Method Embodiment 1 A method of operating a communications system including at least one base station (e.g., gNB or ng-eNB) that uses unlicensed spectrum, the method comprising: receiving (208), at a first base station a first paging request from a network node, e.g., an (AMF), used to control paging of user equipment (UE) devices, said first paging request being a request to page a first UE device; operating (210) the first base station to perform a paging operation to page the first UE device using unlicensed spectrum; operating (228) the first base station to determine whether said paging operation was successful or unsuccessful; when it is determined that said paging operation was unsuccessful, operating (252) the first base station to communicate a paging response to the network node in response to said first paging request indicating that the paging operation was unsuccessful; and when it is determined that said paging operation was successful, operating (254) the first base station to perform one of i) proceeding with normal base station operation without sending a paging response message to the network node in response to said first paging request or ii) sending a paging success response message to the first network node in response to said paging request.

Method Embodiment 2 The method of Method Embodiment 1, wherein operating (210) the first base station to perform a paging operation includes: operating (212) the first base station to perform a channel sensing condition to determine if the first base station can transmit a page to the first UE using said unlicensed spectrum; operating (216) the first base station to transmit a paging signal to said UE device using said unlicensed spectrum when said channel sensing condition determines that the first base station can transmit the page to the first UE device using said unlicensed spectrum; and operating (224) the first base station to refrain from transmitting the paging signal to said UE when said channel sensing condition determines that the first base station is not authorized (e.g., because the channel is busy) to transmit the page to the first UE using said unlicensed spectrum.

Method Embodiment 3 The method of Method Embodiment 1, wherein operating (228) the first base station to determine whether said paging operation was successful or unsuccessful includes: operating (230) the first base station to determining if a paging signal was transmitted to said first UE device as part of said paging operation; and operating (246) the first base station to determine that the paging operation was not successful when it is determined that paging signal was not transmitted to the first UE as part of said paging operation.

Method Embodiment 4 The method of Method Embodiment 3, wherein the method includes operating (234) the first base station to determine that paging signal was not transmitted to the first UE device as part of said paging operation; and wherein operating (252) the first base station to communicate a paging response to the network node in response to said first paging request indicating that the paging operation was unsuccessful includes operating (258) the first base station to transmit a paging response to the first network node that includes a failure cause code indicating that the reason the paging operation failed was due to a failure by the first base station to transmit the paging signal to the first UE device.

Method Embodiment 5 The method of Method Embodiment 1, wherein operating (228) the first base station to determine whether said paging operation was successful or unsuccessful includes: operating (240) the first base station to determine whether a response was received by the base station from the first UE device in response to a paging signal transmitted to the first UE device.

Method Embodiment 6 The method of Method Embodiment 4, wherein operating (228) the first base station to determine whether said paging operation was successful or unsuccessful includes: operating (246) the first base station to determine that the paging operation was successful based on a determination that a response was received by the base station from the first UE device in response to the paging signal transmitted to the first UE device.

Method Embodiment 7 The method of Method Embodiment 6, wherein operating (228) the first base station to determine whether said paging operation was successful or unsuccessful includes: operating (246) the first base station to determine that the paging operation was not successful based on a determination that a response was not received by the base station from the first UE device in response to the paging signal transmitted to the first UE device.

Method Embodiment 8 The method of Method Embodiment 7, wherein operating (252) the first base station to communicate the paging response to the network node in response to said first paging request indicating that the paging operation was unsuccessful includes operating (260) the first base station to transmit a paging response to the first network node that includes a failure cause code indicating that the reason the paging operation failed was due to a failure to receive a reply from the first UE device (e.g., in response to the transmitted paging signal).

Method Embodiment 9 The method of Method Embodiment 1, further comprising: operating (270) the network node to implement a paging escalation strategy as a function of a failure cause code in a received paging response message.

Method Embodiment 10 The method of Method Embodiment 9, wherein said paging operation was unsuccessful, wherein said paging response communicated a failure cause code indicating that the reason that the paging operation failed was due to a failure to receive a reply from the first UE device, and wherein operating (270) the network node to implement a paging escalation strategy as a function of a failure cause code in a received paging response message includes: operating (280) the network node to send a paging request to a second base station requesting the second base station to page the first UE device, in response to said communicated failure cause code indicating that the reason that the paging operation failed was due to a failure to receive a reply from the first UE device.

Method Embodiment 11 The method of Method Embodiment 9, wherein said paging operation was unsuccessful, wherein said paging response communicated a failure cause code indicating that the reason that the paging operation failed was due to a failure by the first base station to transmit the paging signal to the first UE device, and wherein said first paging request was an initial attempt; and wherein operating (270) the network node to implement a paging escalation strategy as a function of a failure cause code in a received paging response message includes operating the network node to re-send (284) the first paging request to the first base station, in response to said communicated failure cause code indicating that the reason that the paging operation failed was due to a failure by the first base station to transmit the paging signal to the first UE device (e.g., because of unavailability of unlicensed spectrum (LBT not clearing)) and said first paging request being an initial attempt.

Numbered List of Exemplary System Embodiments:

System Embodiment 1 A communications system (100) comprising: a first base station (e.g., gNB or ng-eNB) (104) that uses unlicensed spectrum, said first base station (104) including: a first processor (302) configured to: control the first base station to receive (208), at a first base station a first paging request from a network node (102), e.g., an (AMF), used to control paging of user equipment (UE) devices (110, 112, 114, 116, 118, 120, . . . , 122), said first paging request being a request to page a first UE device (110); control the first base station to perform (210) a paging operation to page the first UE device using unlicensed spectrum; determine (228) whether said paging operation was successful or unsuccessful; control the first base station to communicate (252) a paging response to the network node in response to said first paging request indicating that the paging operation was unsuccessful, when it is determined that said paging operation was unsuccessful, and control the first base station to perform (254) one of i) proceeding with normal base station operation without sending a paging response message to the network node in response to said first paging request or ii) sending a paging success response message to the first network node in response to said paging request, when it is determined that said paging operation was successful.

System Embodiment 2 The communications system of System Embodiment 1, wherein said first processor is configured to: operate (212) the first base station to perform a channel sensing condition to determine if the first base station can transmit a page to the first UE using said unlicensed spectrum; operate (216) the first base station to transmit a paging signal to said UE device using said unlicensed spectrum when said channel sensing condition determines that the first base station can transmit the page to the first UE device using said unlicensed spectrum; and operate (224) the first base station to refrain from transmitting the paging signal to said UE when said channel sensing condition determines that the first base station is not authorized (e.g., because the channel is busy) to transmit the page to the first UE using said unlicensed spectrum, as part of being configured to control (210) the first base station to perform a paging operation.

System Embodiment 3 The communications system of System Embodiment 1, wherein said first processor is configured to: operate (230) the first base station to determine if a paging signal was transmitted to said first UE device as part of said paging operation; and operate (246) the first base station to determine that the paging operation was not successful when it is determined that paging signal was not transmitted to the first UE as part of said paging operation, as part of being configured to determine whether said paging operation was successful or unsuccessful.

System Embodiment 4 The communications system of System Embodiment 3, wherein said first processor is configured to: operate (234) the first base station to determine that paging signal was not transmitted to the first UE device as part of said paging operation; and operate (258) the first base station to transmit a paging response to the first network node that includes a failure cause code indicating that the reason the paging operation failed was due to a failure by the first base station to transmit the paging signal to the first UE device, as part of being configured to operate (252) the first base station to communicate a paging response to the network node in response to said first paging request indicating that the paging operation was unsuccessful.

System Embodiment 5 The communications system of System Embodiment 1, wherein said first processor is configured to: operate (240) the first base station to determine whether a response was received by the base station from the first UE device in response to a paging signal transmitted to the first UE device, as part of being configured to operate (228) the first base station to determine whether said paging operation was successful or unsuccessful includes:

System Embodiment 6 The communications system of System Embodiment 4, wherein said first processor is configured to: operate (246) the first base station to determine that the paging operation was successful based on a determination that a response was received by the base station from the first UE device in response to the paging signal transmitted to the first UE device, as part of being configured to determine (228) whether said paging operation was successful or unsuccessful.

System Embodiment 7 The communications system of System Embodiment 6, wherein said first processor is configured to operate (246) the first base station to determine that the paging operation was not successful based on a determination that a response was not received by the base station from the first UE device in response to the paging signal transmitted to the first UE device, as part of being configured to determine (228) whether said paging operation was successful or unsuccessful.

System Embodiment 8 The communications system of System Embodiment 7, wherein said first processor is configured to: operate (260) the first base station to transmit a paging response to the first network node that includes a failure cause code indicating that the reason the paging operation failed was due to a failure to receive a reply from the first UE device (e.g., in response to the transmitted paging signal), as part of being configured to control (252) the first base station to communicate the paging response to the network node in response to said first paging request indicating that the paging operation was unsuccessful.

System Embodiment 9 The communications system (100) of System Embodiment 1, further comprising: said network node (102) including a second processor (1302); and wherein said second processor is configured to: operate (270) the network node to implement a paging escalation strategy as a function of a failure cause code in a received paging response message.

System Embodiment 10 The communications system of System Embodiment 9, wherein said paging operation was unsuccessful, wherein said paging response communicated a failure cause code indicating that the reason that the paging operation failed was due to a failure to receive a reply from the first UE device, and wherein said second processor is configured to operate (280) the network node to send a paging request to a second base station requesting the second base station to page the first UE device, in response to said communicated failure cause code indicating that the reason that the paging operation failed was due to a failure to receive a reply from the first UE device, as part of being configured to operate (270) the network node to implement a paging escalation strategy as a function of a failure cause code in a received paging response message includes:

System Embodiment 11 The communications system of System Embodiment 9, wherein said paging operation was unsuccessful, wherein said paging response communicated a failure cause code indicating that the reason that the paging operation failed was due to a failure by the first base station to transmit the paging signal to the first UE device, and wherein said first paging request was an initial attempt; and wherein said second processor is configured to operate the network node to re-send (284) the first paging request to the first base station, in response to said communicated failure cause code indicating that the reason that the paging operation failed was due to a failure by the first base station to transmit the paging signal to the first UE device (e.g., because of unavailability of unlicensed spectrum (LBT not clearing)) and said first paging request being an initial attempt, as part of being configured to operate (270) the network node to implement a paging escalation strategy as a function of a failure cause code in a received paging response message.

Number List of Exemplary Computer Readable Medium Embodiments

Computer Readable Medium Embodiment 1 A non-transitory computer readable medium (310) including computer executable instructions which when executed by a processor (302) control a first base station (104 or 300) that uses unlicensed spectrum to perform the steps of: receiving, at said first base station a first paging request from a network node, used to control paging of user equipment (UE) devices, said first paging request being a request to page a first UE device; operating the first base station to perform a paging operation to page the first UE device using unlicensed spectrum; operating the first base station to determine whether said paging operation was successful or unsuccessful; when it is determined that said paging operation was unsuccessful, operating the first base station to communicate a paging response to the network node in response to said first paging request indicating that the paging operation was unsuccessful; and when it is determined that said paging operation was successful, operating the first base station to perform one of i) proceeding with normal base station operation without sending a paging response message to the network node in response to said first paging request or ii) sending a paging success response message to the first network node in response to said paging request.

The techniques of various embodiments may be implemented using software, hardware and/or a combination of software and hardware. Various embodiments are directed to apparatus, e.g., user devices such as a user equipment (UE) device, base stations such as a gNB or ng-eNB, network nodes, an AMF device, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, base stations, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a base station, the method comprising:
   operating the base station to determine that a paging signal was not transmitted to a first user equipment (UE) device as part of an unsuccessful paging operation performed in response to a first paging request received by the base station from a network node; and
   operating the base station to communicate a paging response to the network node in response to said first paging request indicating that base station did not transmit a paging signal in response to the first paging request.

2. The method of claim 1, wherein the paging response indicates that said paging operation was unsuccessful.

3. The method of claim 1, further comprising:
   performing, at the base station, a channel sensing condition operation to determine if the base station can transmit the paging signal to the first UE device; and
   wherein said channel sensing condition operation determined that the base station could not transmit the paging signal to the first UE device.

4. The method of claim 3, wherein said base station uses unlicensed spectrum.

5. The method of claim 4, further comprising:
   operating the base station to perform a maximum number of transmission attempts before making a determination that a paging operation performed in response to the first paging request received by the base station from a network node was unsuccessful.

6. The method of claim 5,
   wherein operating the base station to communicate a paging response to the network node in response to said first paging request includes sending a signal to the network node including a failure cause code indicating that the reason the paging operation failed was due to a failure by the base station to transmit the paging signal to the first UE device.

7. The method of claim 1, further comprising:
   operating the base station to make multiple attempts to transmit a paging signal to the first UE prior to communicating the paging response to the network node.

8. The method of claim 7, wherein operating the base station to make multiple attempts to transmit a paging signal to the first UE includes performing multiple channel sensing operations to determine if the base station can use unlicensed spectrum to transmit the paging signal to the first UE.

9. The method of claim 1, wherein the base station uses unlicensed spectrum.

10. The method of claim 1, wherein said base station is a gNB or ng-eNB.

11. The method of claim 10 wherein the unsuccessful paging operation includes a listen before talk operation performed by the base station to determine if the base station is clear to use unlicensed spectrum to transmit a paging signal to the first UE device.

12. A base station, comprising:
   a receiver;
   a transmitter; and a processor configured to control the base station to perform the steps of:

determining that a paging signal was not transmitted to a first user equipment (UE) device as part of an unsuccessful paging operation performed in response to a first paging request received from a network node; and communicating a paging response to the network node in response to said first paging request indicating that a paging signal was not transmitted in response to the first paging request.

13. The base station of claim 12, wherein the paging response includes a failure code that indicates that the reason why said paging operation was unsuccessful was that the paging signal was not transmitted.

14. The base station of claim 13, wherein said processor is further configured to control the base station to:

perform a channel sensing condition operation to determine if the base station can transmit the paging signal to the first UE device.

15. The base station of claim 14, wherein said base station uses unlicensed spectrum.

16. The base station of claim 13, wherein the processor is further configured to control the base station to:

determine, prior to sending said paging response to the network node, if a paging operation performed in response to said first paging request was successful or unsuccessful.

17. The base station of claim 13, wherein the processor is further configured to control the base station to:

attempt to transmit a paging signal to the first UE multiple times before sending the response indicating that the paging signal was not transmitted in response to the first paging request.

18. The base station of claim 13, wherein the processor is further configured to control the base station to:

perform a channel sensing operation as part of each attempt to transmit the paging signal to the first UE.

19. The base station of claim 18, wherein the base station uses unlicensed spectrum.

20. The base station of claim 12, wherein the processor is further configured to:

control the base station to perform multiple channel sensing operations to determine if the paging signal to the first UE device can be transmitted before sending the paging response to the network node in response to said first paging request indicating that a paging signal was not transmitted in response to the first paging request.

\* \* \* \* \*